United States Patent [19]

Ueda

[11] Patent Number: 5,036,475

[45] Date of Patent: Jul. 30, 1991

[54] IMAGE MEMORY DATA PROCESSING CONTROL APPARATUS

[75] Inventor: Tomoaki Ueda, Kyoto, Japan

[73] Assignee: Daikin Industries, Ltd., Japan

[21] Appl. No.: 265,896

[22] Filed: Nov. 2, 1988

[30] Foreign Application Priority Data

Nov. 2, 1987 [JP] Japan .............................. 62-278004
Nov. 2, 1987 [JP] Japan .............................. 62-278005

[51] Int. Cl.[5] .............................................. G06F 3/14

[52] U.S. Cl. .................................. 364/518; 364/521; 340/728; 340/747; 340/750

[58] Field of Search ...................... 364/518, 521, 522; 340/547, 729, 750, 798, 799, 731, 728; 382/46

[56] References Cited

U.S. PATENT DOCUMENTS 4,295,135 10/1981 Sukonick ............................ 340/734
4,719,585 1/1988 Cline et al. .......................... 364/518
4,755,810 7/1988 Knierim ............................. 340/726
4,766,431 8/1988 Kobayashi et al. ................ 340/799

*Primary Examiner*—Gary V. Harkcom
*Assistant Examiner*—Phu K. Nguyen
*Attorney, Agent, or Firm*—Beveridge, DeGrandi & Weilacher

[57] ABSTRACT

An image memory data processing control apparatus having an image memory unit divided into a plurality of block memories, for each of which each pixel register and each timing control means are disposed, whereby a high-speed data drawing may be made. When executing a bitblt processing, writing decoders and reading decoders select modules associated with the pixel registers concerned. Data are read out from the image memory unit and data obtained by a raster operation are written into the image memory unit.

20 Claims, 17 Drawing Sheets

IMAGE MEMORY DATA PROCESSING CONTROL APPARATUS

BACKGROUND OF THE INVENTION

1. Field of the Invention

The present invention relates to an image memory data processing control apparatus, and more particularly to a novel-type image memory data processing control apparatus capable of achieving a high-speed image memory access by a linear interpolation operation unit(s) (hereinafter referred to as a DDA(s)), as well as a high-speed bit boundary block transfer operation (hereinafter referred to as a bitblt).

2. Description of the Relevant Art

In a graphic display apparatus of the raster scanning type, a multi-function performance has been required, in addition to the basic requirements of high-speed image display and decrease in cost of the entire system. In particular, the demand for a multi-window display is now prevailing.

There have been proposed the following two methods for achieving a multi-window display:

1) a so-called hardware method in which a control circuit is disposed for controlling a plurality of frame buffers in which image data for display previously divided into each window are stored, and according to display timing, the addresses of display data are successively switched so as to provide a display wherein overlaps of each image are taken into consideration, thereby to achieve a multi-window display; and 2) a so-called bitblt method in which image data to be displayed in multi-windows held in memories, are read out one by one in bytes, the data thus read out undergo a raster operation and are then written into a frame buffer. Pixel data read out from the memory for each window area are transferred to the frame buffer with the transfer order set according to a multi-window display to be made, thereby to achieve a multi-window display.

According to the hardware method, the desired display may be obtained by merely mixing multi-window display screens. Memory transfer is therefore not required. Accordingly, a high-speed multi-window display may be made, regardless of the sizes of the display windows.

According to the bitblt method, a desired number of window displays may be made on the screen at arbitrary portions thereof. This remarkably enhances the degree of freedom of a multi-window display. In this method, the arrangement may be made such that the memories also serve as the frame buffer, and vice versa.

According to the hardware method, the number of windows on which a multi-window display is to be made is determined by the division number of the display screen. This presents the problem that the max. number of windows is determined by the system design. It is therefore not possible to increase the number of windows as desired on the spot. Further, even though a multi-window display with a few number of windows is to be actually made, there is still required a circuit arrangement for achieving a multi-window display with a predetermined division number of windows. This creates a problem of lowering the using efficiency of the hardware in its entirety.

Further, according to the circuit for displaying a mixed screen, the higher resolution display, the higher-speed device is required. This creates a problem of increasing the cost of the entire apparatus.

The bitblt method presents the problem that the composite screen display speed cannot be increased so much. That is, it is required in the bitblt method to transfer pixel data for an area to be window-displayed with the priority order taken into consideration. This increases the load of transferring data to the memories if the window areas are increased in size. Thus, the time required for completing the window composition is increased.

More specifically, when executing the bitblt processing in a bit map display apparatus, there is adopted a mode in which a plurality of pixel data continuous in the scanning line direction are accessed in one memory access. For example, as shown in FIG. 15, pixel data for two words are read out from the source area (See FIG. 15 (B)) and a shift processing is executed with the use of a barrel shifter (not shown) such that the processing start pixel position is set to the processing start pixel position at the destination area side (See FIG. 15 (C)). Then, a raster operation is executed, after which a mask processing is executed according to the processing start pixel position. Then, the data are written into the destination area, thus completing the bitblt processing.

In a bit map display apparatus, there are generally available three frame buffer access modes, i.e., a pixel mode, a plane mode and a fill-in mode.

In the pixel mode, provision is made such that access is made simultaneously to data for the same one pixel in the respective planes of the frame buffer.

In the plane mode, provision is made such that access is made simultaneously to data for a plurality of pixels in any one plane of the frame buffer.

In the fill-in mode, provision is made such that access is made based on color data previously set for pixels selected out of an area including a plurality of pixels of selected planes of the frame buffer.

In a three-dimensional graphic display apparatus, when displaying a figure which has undergone a shading processing, a three-dimensional hidden surface removal or the like, the pixel mode is, in principle, selected because the pixels generally have different color data or depth values (hereinafter referred to as z-values). Accordingly, only one-pixel data are drawn in every memory cycle. For example, when the frame buffer has a memory cycle of 400 nsec, the maximum pixel drawing speed is 2.5M pixels/second. With overhead taken into consideration, there may be drawn, in every second, about 50,000 arbitrary short vectors, each vector having 40 pixels, or about 5,000 polygons, each polygon being a regular square with its sides having 20 pixels being inclined at an arbitrary angle with respect to the scanning lines. Such drawing speed is not sufficiently high.

In view of the foregoing, a raster scanning graphic display apparatus uses a pixel buffer capable of temporarily holding data for a plurality of pixels, such that data for a plurality of pixels may be collectively written in one memory cycle.

To further speed up the processing, it becomes a common practice to provide a pair of such pixel buffers. It seems that such pixel buffer method may be approximated, to a certain extent, to the fill-in mode in a bit map display apparatus. In the fill-in mode, however, a fill-in color register (hereinafter referred to as a FCR) supplies a common value to all pixels within a word boundary. In the pixel buffer method, it is not possible to arrange for a common value to be supplied to all pixels within a word boundary by the FCR. Accordingly, both methods are considerably different from each other.

In the pixel buffer method, the number of data lines in the frame buffer memory is set to a value equal to the product of the number of planes and the number of bits of one word. Accordingly, the pixel buffer method is most fit to achieve the fill-in mode which merely requires that the same values be stored in all FCRs of the pixel buffer and that the pixels designated by the FCRs be overwritten only on pixels concerned, according to mask data. On the contrary, if it is intended to achieve a mode other than the fill-in mode, a considerable number of multiplexers or selectors should be added due to an increased number of data lines as above-mentioned (For example, 192 data lines are required for 16M colors and 8 bits/word). This disadvantageously complicates the entire arrangement. That is, as a data line selecting direction, different directions are used in the pixel mode and in the plane mode. To select both modes requires a considerable number of multiplexers or selectors.

As apparent from the foregoing, it is almost impossible to simultaneously achieve both functions, i.e., the bitblt function in a bit map display and a high-speed drawing function in a raster scanning three-dimensional graphic display. In an arrangement in which one function may be fully fulfilled, the other function cannot be satisfactorily achieved. Thus, a multi-function requirement cannot be fully satisfied.

In particular, when a polygon filling needs to be executed, it is required to generate a considerable number of pixel data. Accordingly, even though provision is made such that a linear interpolation operation is continuously made by a DDA unit without substantial interruption thereof, both the drawing function and the bitblt function cannot be achieved at a high speed as desired.

SUMMARY OF THE INVENTION

It is an object of the present invention to achieve a high-speed image memory access by a DDA(s).

It is another object of the present invention to achieve a high-speed bitblt processing.

It is a further object of the present invention to achieve a high-speed drawing processing by a DDA(s) even though a filling processing is included.

It is still another object of the present invention to achieve a high-speed bitblt processing even though a filling processing is included.

To achieve the objects above-mentioned, the image memory data processing control apparatus in accordance with a first embodiment of the present invention comprises: a plurality of block memories providing an image memory unit; pixel registers; timing control means; decoding means for writing; delay means; decoding means for reading; pixel data temporary holding means; selection means; and operation means.

Each of the pixel registers is disposed for each of the block memories, and is adapted to hold a predetermined number of pixel data continuous in the scanning line direction.

The timing control means is adapted to generate control signals for selecting the block memories concerned and the pixel registers concerned based on access address data supplied from a linear interpolation operation unit.

The decoding means for writing is adapted to generate signals for selecting the modules for a predetermined number of pixels, out of a predetermined number of the pixel registers, based on access address data supplied from the DDA.

The delay means is adapted to delay the transmission of the access address data supplied from the DDA by a predetermined period of time.

The decoding means for reading is adapted to generate signals for selecting the modules for a predetermined number of pixels, out of a predetermined number of the pixel registers, based on address data supplied from the delay means.

The pixel data temporary holding means is adapted such that the address data thereof are successively changed synchronously with the operation of the DDA. The pixel data temporary holding means is also adapted to continuously store data supplied from the modules selected by the decoding means for reading, along the linear interpolation locus. The data thus stored are adapted to be supplied to the modules selected by the decoding means for writing.

The selection means is adapted to selectively supply pixel data generated by the DDA or pixel data read out by the pixel data temporarily holding means to the modules concerned.

The operation means is adapted to execute a raster operation provided that the pixel data read out from the pixel data temporary holding means have been selected by the selection means.

The delay means may be a First-In First-Out memory (hereinafter referred to as a FIFO memory) adapted to delay the transmission of the address data supplied from the DDA, by a predetermined period of time, or may be a DDA for generating address data as delayed by a predetermined period of time.

The pixel data temporary holding means may comprise a static random access memory (hereinafter referred to as a SRAM) and an up-counter for successively incrementing the address data of the pixel data temporarily holding means, or may comprise a FIFO memory.

Preferably, the timing control means may decode the contents of lower digits of the coordinate data in the scanning line direction, thereby to generate control signals for switching the pixel registers, and may also decode the contents of lower digits of the coordinate data in a direction at a right angle to the scanning line direction, thereby to generate control signals for selecting the pixel registers. Preferably, the timing control means may time generation of the control signals with a change in the contents of predetermined lower digits of the coordinate data. In the latter case, the timing control means may more preferably be arranged such that, as to the coordinate data in the scanning line direction, the control signals are generated according to the timing of a change in the contents of predetermined lower digits defined by the capacity of the pixel registers, and as to the coordinate data in a direction at a right angle to the scanning line direction, the control signals are generated according to the timing of a change in the contents of the least significant digits.

Preferably, the image memory unit may be a dual-port dynamic random access memory.

According to the image memory data processing control apparatus having the arrangement above-mentioned, when merely executing a data drawing, a number of pixel data on vectors to be drawn may be successively generated at very short time intervals by the DDA which operates at a high speed. The pixel data successively generated may be supplied to the pixel registers corresponding to the scanning lines to which the pixel data belong, and at least one-pixel data held by each of the pixel registers concerned may be collectively written into the block memories concerned.

Accordingly, for both vectors in the scanning line direction and vectors inclined with respect to the scanning line direction, the pixel data may be written into the image memory unit without interrupting the DDA arithmetic operation. As the result, writing data into the image memory unit may be made at a speed equal to the DDA arithmetic operation speed, when consideration is made for one-pixel data. Thus, the entire drawing speed may be considerably improved.

When executing the bitblt processing, address data for a vector in the source area may be successively generated by the DDA and the address data thus generated may be supplied, as reading addresses, into the image memory unit. Then, the pixel data may be successively supplied, as delayed by a predetermined period of time by the delay means and as controlled by the timing control means, to the pixel data temporary holding means through the pixel register concerned. The pixel data are then temporarily held. Then, address data for a vector in the destination area may be successively generated. Data read out from the destination area and data read out from the pixel data temporary holding means are supplied to the operation means, which executes a raster operation. The resultant data obtained by the raster operation are written into the destination area through those modules of the pixel register concerned, selected based on data supplied from the decoding means for writing. Thus, the source data may be transferred to the destination area.

A series of the operations above-mentioned may be repeated for all vectors, thereby to achieve data transfer for a multi-window display.

It is apparent from the foregoing that, when executing the bitblt processing, it is required to execute an arithmetic operation in the DDA in order to read out the source data, and it is also required to execute an arithmetic operation in the DDA in order to write the data into the destination area. Accordingly, the entire processing speed may be improved to the extent equal to a half of the DDA arithmetic operation speed.

To achieve the objects above-mentioned, the image memory data processing control apparatus in accordance with a second embodiment of the present invention further comprises a plurality of filling DDAs and shift means, in addition to the component elements which constitute the image memory data processing control apparatus in accordance with the first embodiment of the present invention.

In the shift means, shift amounts are respectively set based on the coordinate data in a direction at a right angle to the scanning line direction in the source area and based on the coordinate data in a direction at a right angle to the scanning line direction in the destination area. The shift means is adapted to shift pixel data read out from the pixel data temporary holding means, by the preset shift amounts. Preferably, a barrel bus shifter may be used. The barrel bus shifter comprises a predetermined number of barrel shifters connected in parallel with one another corresponding to the number of bits of the bus.

According to the image memory data processing control apparatus having the arrangement above-mentioned, when merely executing the data drawing, a plurality of DDAs operable at a high speed generate successively and simultaneously a number of pixel data along the scanning lines at very short time intervals. Based on control signals generated by the timing control means, filling pixel data may be supplied to the pixel registers concerned and at least one-pixel data held by each of the pixel registers above-mentioned may be collectively written into the block memories concerned.

Accordingly, the time required for generating data and the time required for writing the data may be shortened as compared with the time required for generating data by the DDAs, when consideration is made for one-pixel data. As a whole, the drawing speed may be improved, to achieve, in real time, a display of an image as filled.

When executing the bitblt processing, the DDAs generate successively and simultaneously address data along different scanning lines in the source area. The address data thus generated are supplied, as reading addresses, to the image memory unit. Then, pixel data are successively supplied, as delayed by a predetermined period of time by the delay means and as controlled by the timing control means, to the pixel data holding means through the pixel registers concerned. The pixel data thus supplied are then temporarily held. The DDAs successively generate address data along different scanning lines in the destination area. Supplied to the operation means are:

(i) data read out from the destination area; and (ii) data read out from the pixel data temporarily holding means and shifted to a direction at a right angle to the scanning line direction by the shift means.

Then, these data undergo a raster operation. The resultant data obtained by the raster operation are written into the destination area through those modules of the pixel registers, selected based on output data supplied from the decoding means for writing. Thus, the source area data may be transferred to the destination area.

A series of the operations above-mentioned are carried out for all scanning lines to achieve data transfer for a multi-window display or the like.

It is apparent from the foregoing that, when executing the bitblt processing, it is required to execute an arithmetic operation in the DDAs in order to read out the source area data, and it is also required to execute an arithmetic operation in the DDAs in order to write the data into the destination area. Accordingly, the entire processing speed may be lowered as compared with the case where mere data drawing is made. However, the entire processing speed may be improved to the extent equal to or more than a half of the filling processing speed with the use of the DDAs. Thus, a high-speed bitblt processing may be satisfactorily made.

BRIEF DESCRIPTION OF THE DRAWINGS

FIGS. 11(A)-1, 11(A)-2, 11(B)-1, 11(B)-2 are the block diagram of an image memory data processing control apparatus in accordance with a second embodiment of the present invention;

DESCRIPTION OF THE PREFERRED EMBODIMENTS

Figures 1, 11A:
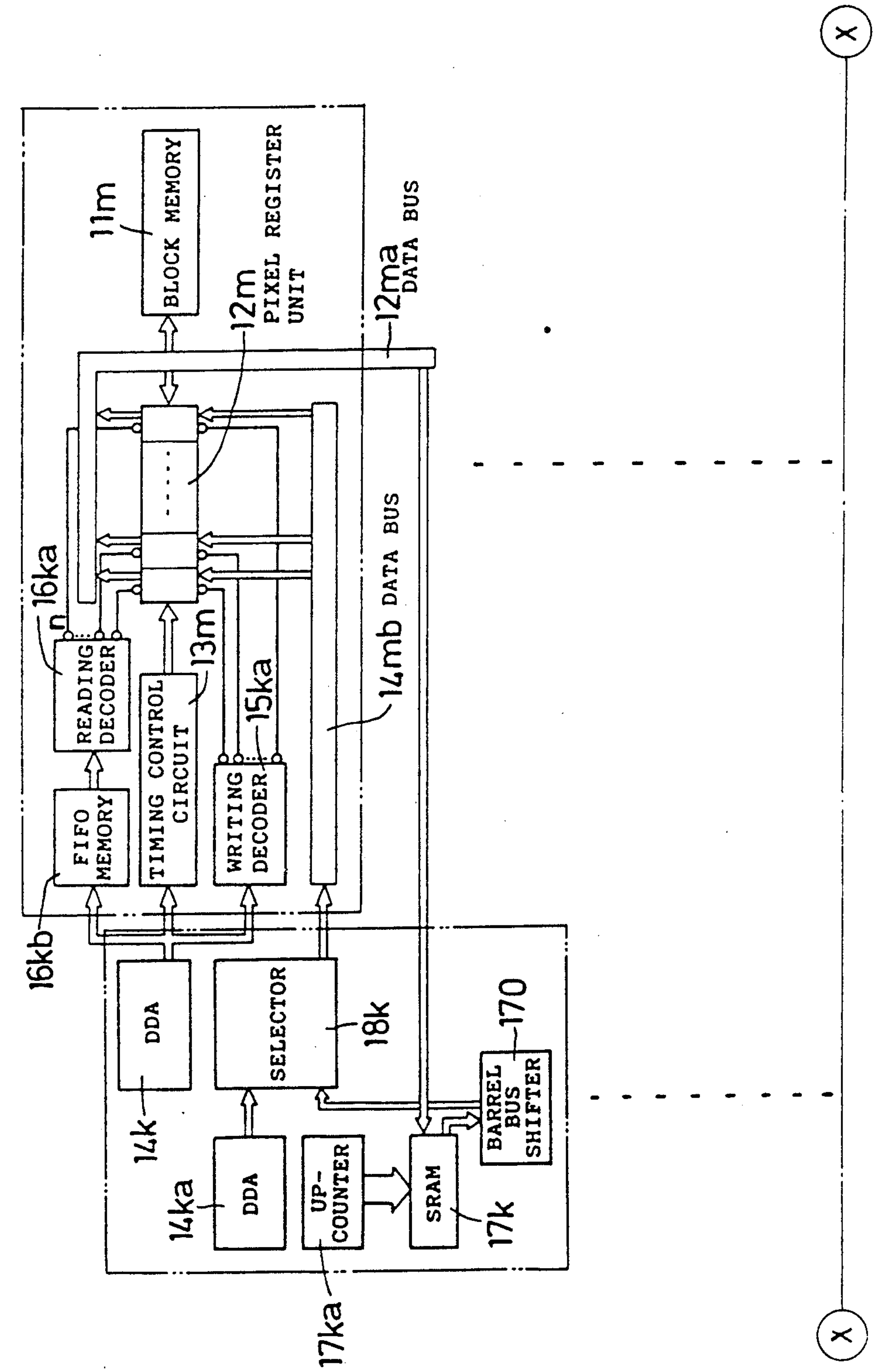
Figures 2, 11A:
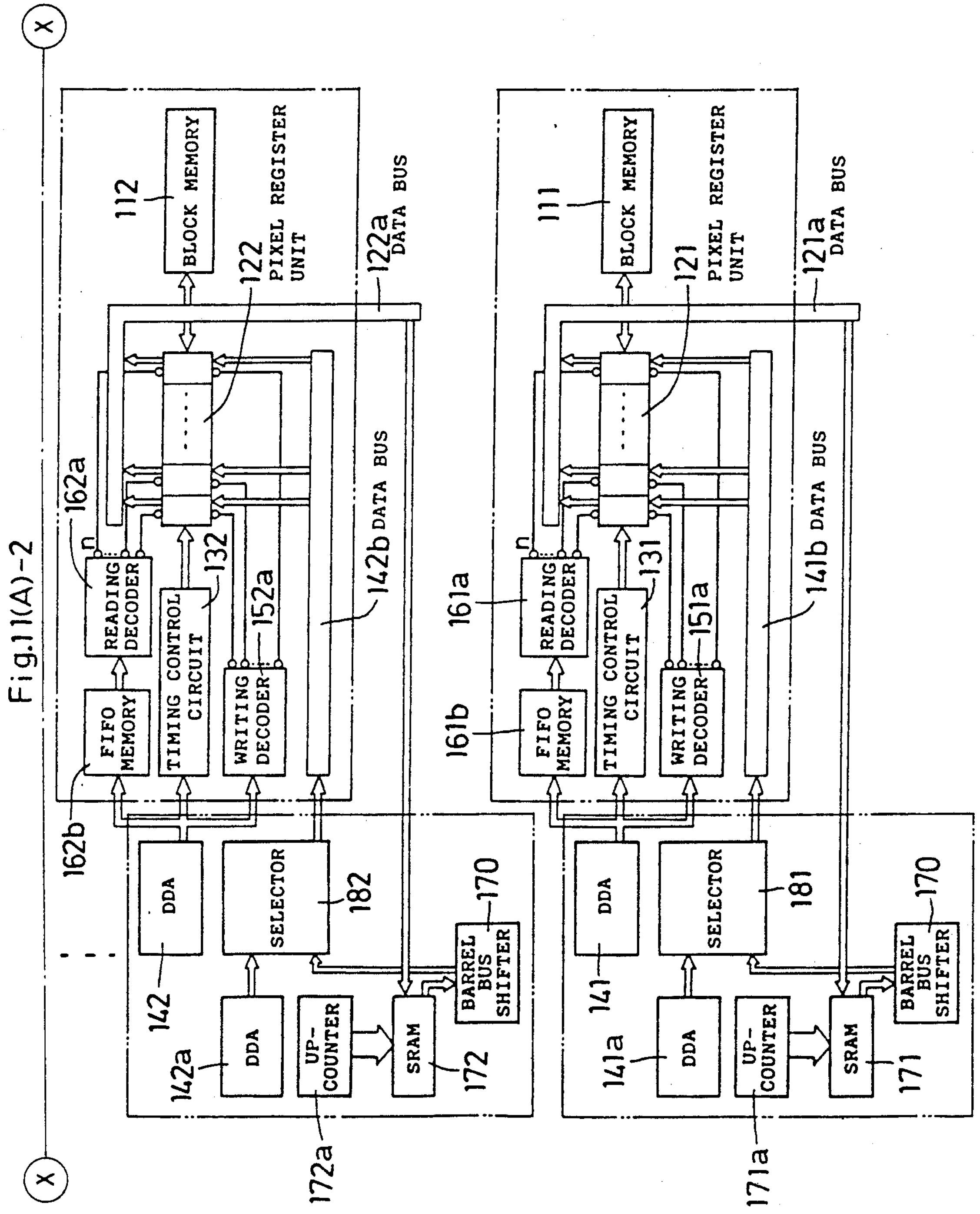
Figures 1, 11B:
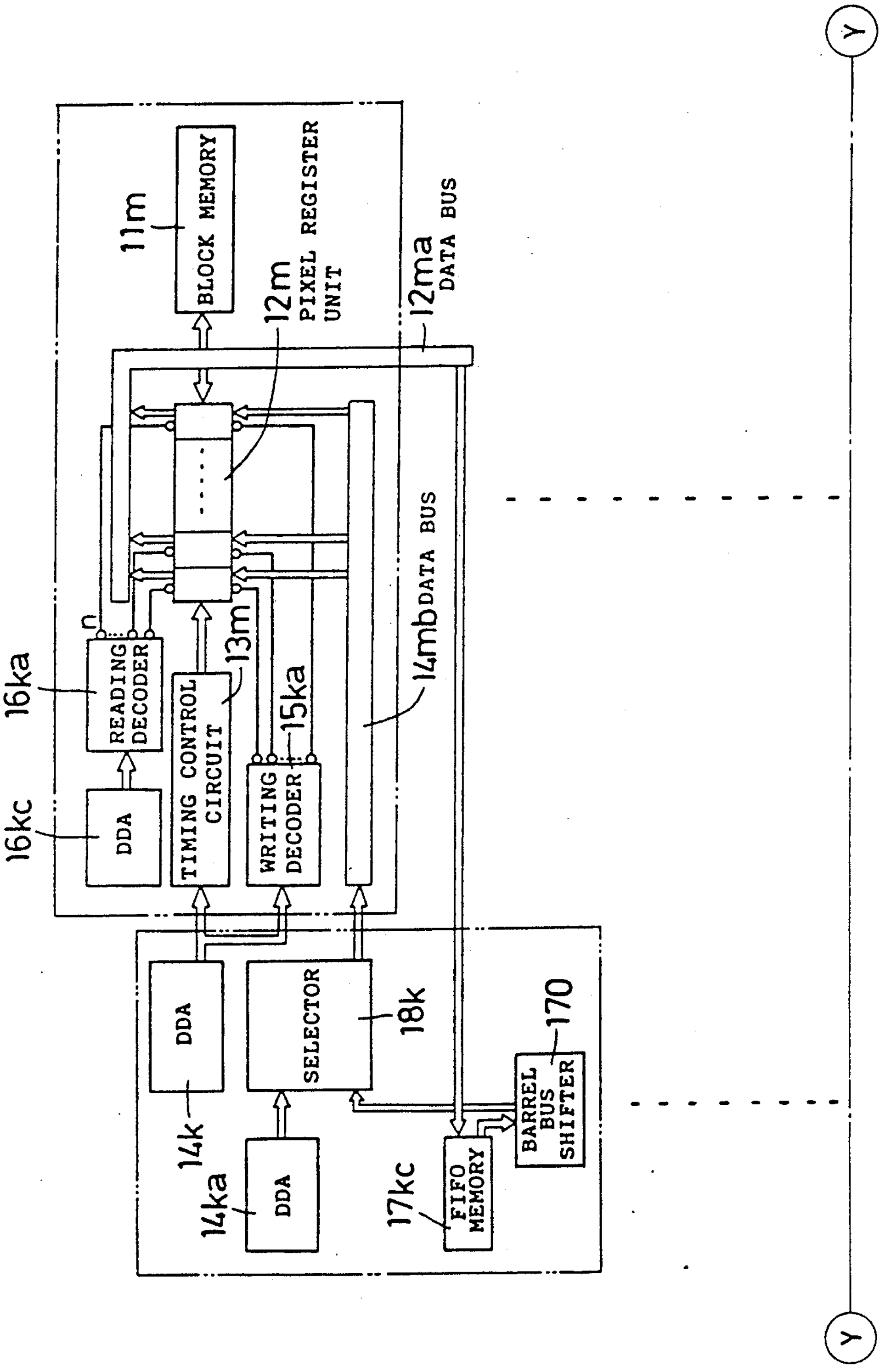
Figures 2, 11B:
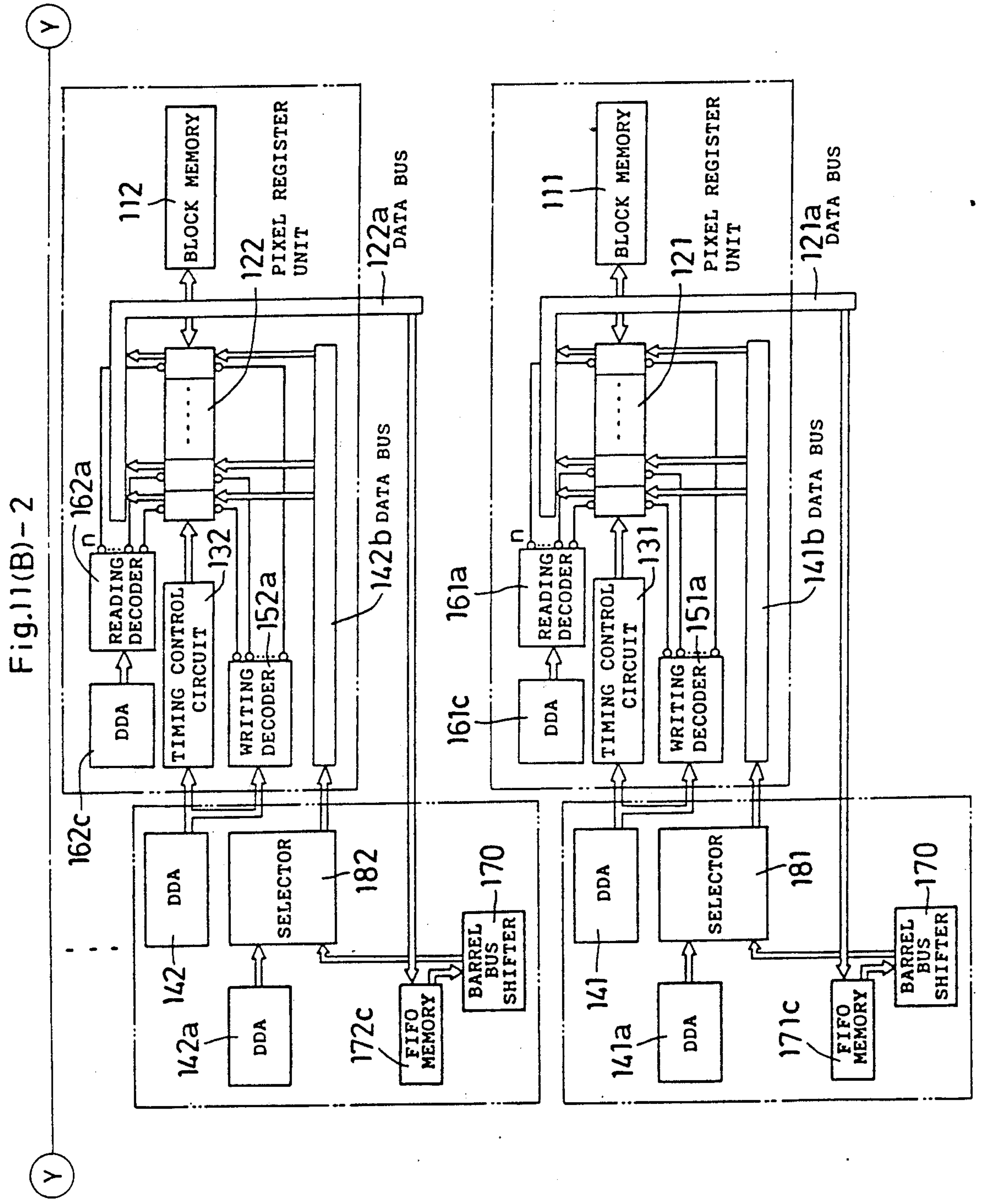

FIG. 1 (A) is a block diagram of the image memory data processing control apparatus in accordance with a first embodiment of the present invention.

In FIG. 1 (A), an image memory unit 1 is divided into a plurality of block memories 11, 12, . . . 1m, for each of which one of pixel registers 21, 22, . . . 2m and one of timing control circuits 31, 32, . . . 3m are disposed. Based on control signals supplied from the timing control circuits, the transmission and reception of pixel data may be made between the pixel registers concerned and the block memories concerned. Each of the pixel registers has n modules in the scanning line direction.

Disposed is a DDA 4 for receiving address data of the end points of vectors and for executing a linear interpolation operation, thereby to successively generate address data for the image memory unit 1. Also disposed is a DDA 4a for executing a linear interpolation operation synchronously with the operation of the DDA 4, thereby to successively generate color information data. Address data supplied from the DDA 4 may be decoded by the timing control circuits, thereby to generate control signals. The address data supplied from the DDA 4 may also be supplied to a writing decoder 5a, which generates write selection signals for (m×n) modules, each write selection signal being generated for each module. The address data supplied from the DDA 4 may also be supplied to a reading decoder 6a through a FIFO memory 6b. The reading decoder 6a may generate read selection signals for the (m×n) modules, each selection signal being generated for each module.

Color information data read out, for every pixel, from the image memory unit 1 to the pixel register unit 2 may be taken out, as they are, to the outside through a first data bus 2a. The color information data above-mentioned may also be supplied to a SRAM 7 serving as a pixel data temporary holding means, through a second data bus 2b and a buffer 2c. The supply of address data to the SRAM 7 may be made by an up-counter 7a whose contents are incremented synchronously with the generation of address data by the DDA 4. This enables the read-out data to be stored, in the read order, into the SRAM 7. The data thus stored are read out, in the storage order, from the SRAM 7.

The color information data generated by the DDA 4a and the color information data read out from the SRAM 7 may be supplied to a selector 8. Data selected by the selector 8 may be supplied, as controlled by the timing control circuit unit 3, to the pixel register unit 2.

Figure 2:
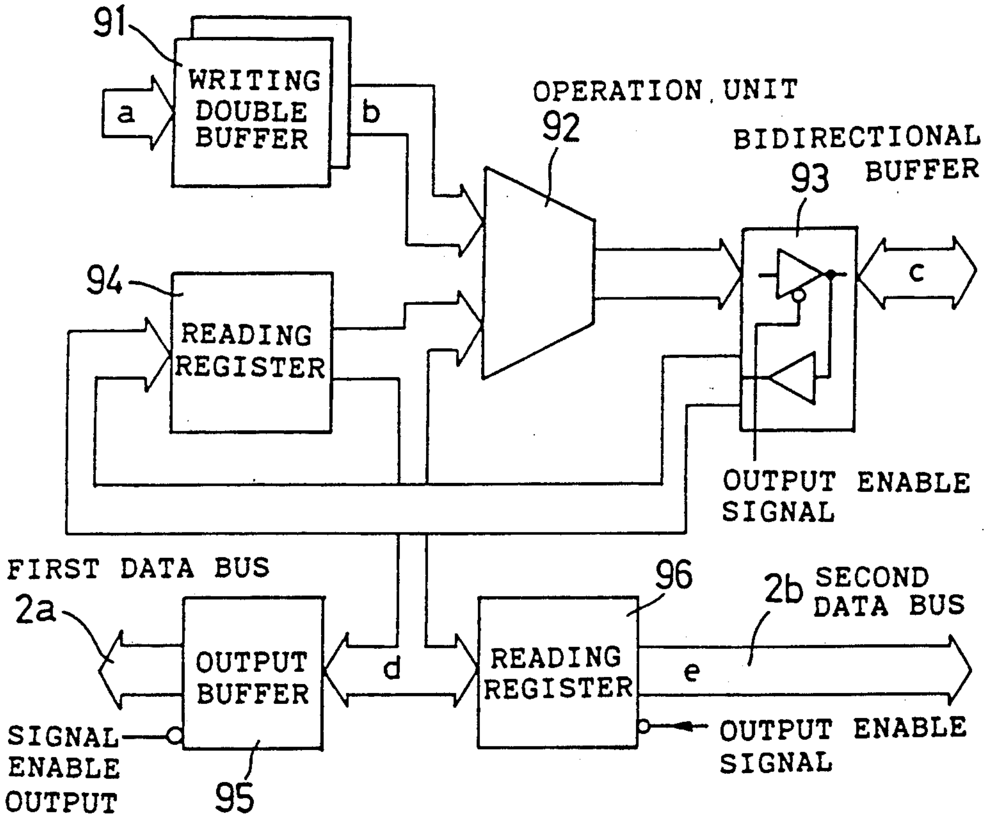
FIG. 2 is a view illustrating, in detail, the arrangement of one of the modules providing a pixel register.

FIG. 2 is a view illustrating, in detail, the arrangement of each of the modules constituting the pixel registers.

The module in FIG. 2 has:

- a writing double buffer 91 for receiving color information for every pixel;
- an operation unit 92 for receiving data read out from the writing double buffer 91; and
- a bidirectional buffer 93 through which operation result data supplied from the operation unit 92 may be supplied to the image memory unit 1 constituted by a DRAM.

Data read out from the image memory unit 1 through the bidirectional buffer 93 are supplied to a reading register 94. Data held by the reading register 94 are also supplied to the operation unit 92, in which a raster operation may be carried out. The data held by the reading register 94 may be supplied to the first data bus 2a through an output buffer 95, and to the second data bus 2b through a reading register 96. The operation unit 92 is so arranged as to achieve a selector function, as well as a raster operating function.

Accordingly, the operation unit 92 may be switched in a mode so as to selectively carry out either mere writing of pixel-unit color information data, or writing of raster operation result data.

The following description will discuss the operation of the image memory data processing control apparatus having the arrangement above-mentioned.

When merely carrying out the pixel data writing operation, the writing decoder 5a and the reading decoder 6a may be inhibited from being operable and the selector 8 may be so switched as to select output data supplied from the DDA 4a.

In such state, when address data are successively generated by the DDA 4, the timing control circuits 31, 32, . . . , 3m generate control signals based on the x- and y-coordinate values of the address data thus generated. Then, there are selected only the pixel registers corresponding to the address data generated. Accordingly, pixel-unit color information data generated by the DDA 4a operable synchronously with the DDA 4, are supplied to the modules concerned of the pixel registers selected.

When such data supply to the pixel registers selected is made to the utmost limit, or when the y-coordinate values undergo a change, all color information data held in the pixel registers above-mentioned are collectively written into the image memory unit 1. Thus, the data writing speed may be improved when consideration is made for one-pixel data.

While data are being written from the pixel registers concerned into the image memory unit 1, pixel-unit color information data which are being continuously supplied from the DDA 4*a*, may be supplied to other pixel registers.

It is therefore possible to write color information data into the image memory unit 1 without interrupting the linear interporation operations by the DDAs 4 and 4*a*. Thus, the entire drawing speed may be improved to the extent equal to the DDA operating speed.

When executing the bitblt processing, the writing decoder 5*a* and the reading decoder 6*a* may be so set as to be operable and the selector 8 may be so switched as to select data read out from the SRAM 7.

In such state, when based on the address data of the end points of a source vector, the DDA 4 successively generates address data for the source vector, the timing control circuits 31, 32, . . . 3*m* generate control signals based on the x- and y-coordinate values, thereby to select the block memories concerned. Then, the pixel data of the block memories thus selected may be read out. The address data are supplied to the reading decoder 6*a*, as delayed by the required time for reading by the FIFO memory 6*b*. The reading decoder 6*a* supplies module selection signals according to the source area to be used and the bitblt processing type to be made. The read data are therefore held only in the modules selected. The read data thus held are then temporarily held, in the read order, by the SRAM 7 through the second data bus 2*b* and the buffer 2*c*. In this case, the address data of the SRAM 7 are incremented by the up-counter 7*a* synchronously with the operation of the DDA 4.

After data for one vector in the source area have been read out, the address data of the end points of a destination vector are supplied to the DDA 4. Then, the address data for the destination vector are successively generated. The address data thus generated are supplied to the timing control circuit unit 3 and the writing decoder 5*a*. Accordingly, based on the x- and y-coordinate values, the timing control circuits 31, 32, . . . 3*m* generate control signals to select the pixel registers concerned and the block memories concerned. The writing decoder 5*a* supplies module selection signals according to the destination area to be used and the type of the bitblt processing to be executed. Thus, the writing data are held by the selected modules only.

The writing data thus held undergo a raster operation by the operation unit 92, and the resultant data are written into the block memories concerned through the bidirectional buffer 93.

The following description will discuss, in detail, the operation of each of the modules constituting the pixel registers.

Figure 3:
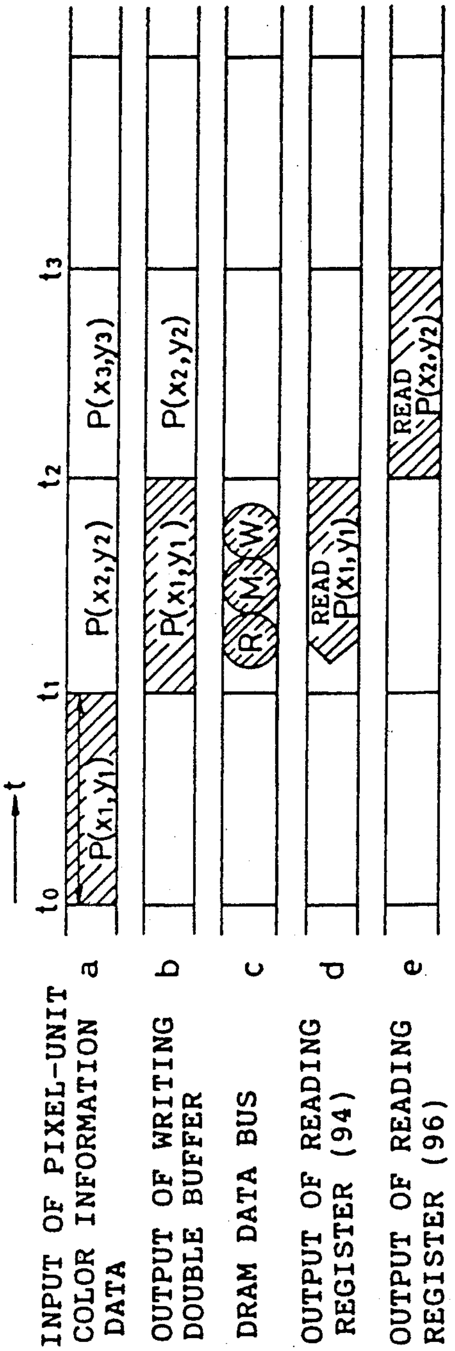
FIG. 3 is a view schematically illustrating the operation of the module in FIG. 2.

As shown in FIG. 3, the color information data of a pixel P (x1, y1) are supplied to the writing double buffer 91 in a period of time from t0 to t1, and a read-modify-write operation (hereinafter referred to as a RMW) is carried out between the writing double buffer 91 and the block memories concerned in a subsequent period of time from t1 to t2. At the same time, the color information data are supplied from the writing double buffer 91 and the color information data are supplied from the reading register 94. Also, at the same time, the color information data of a pixel P (x2, y2) are supplied to the writing double buffer 91. Afterwards, the color information data held by the reading register 94 are supplied through the second data bus 2*b* in a period of time from t2 to t3. At the same time, the RMW is carried out with respect to the pixel P (x2, y2) and the color information data for a pixel P (x3, y3) are supplied.

Accordingly, by repeating the series of operations above-mentioned, the bitblt processing may be executed at a speed equal to about a half of the DDA operating speed. This not only considerably enhances the degree of freedom of a multi-window display, but also achieves simplification of the entire arrangement, as well as a high-speed multi-window display.

Figure 4:
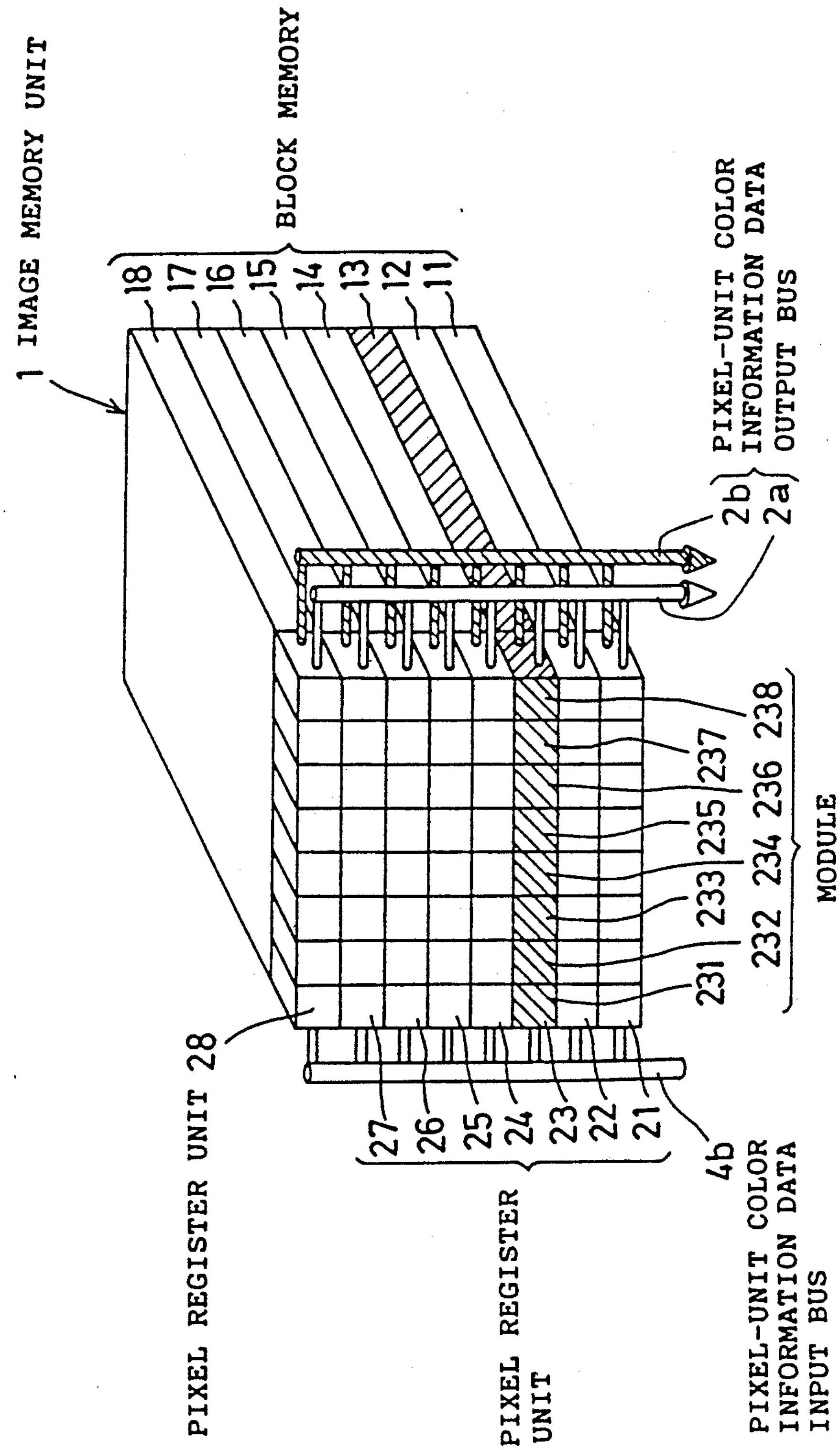
FIG. 4 is a view schematically illustrating a relationship between the modules providing pixel registers and an image memory unit.
Figure 5:
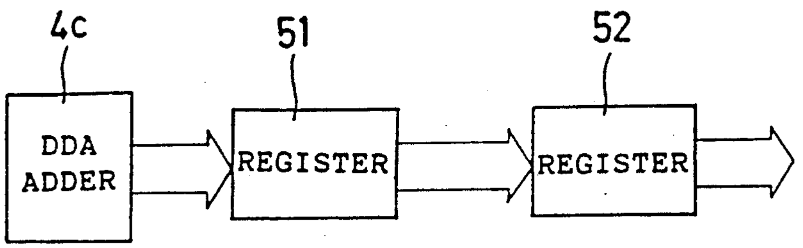
FIG. 5 is a schematic block diagram of a DDA in the form of a pipeline.

FIG. 4 is a view schematically illustrating the relationship between the modules constituting the pixel registers and the image memory unit 1.

The image memory unit 1 is divided into eight block memories 11, 12, . . . 18, and each of eight pixel registers 21, 22, . . . 28 is constituted by eight modules. That is, each of m and n mentioned earlier is here set to eight.

Connected to each of the pixel registers are a pixel-unit color information data input bus 4*b* and a pair of pixel-unit color information data output buses 2*a*, 2*b*.

Accordingly, in a state where the writing decoder 5*a* (See FIG. 1) generates a decode signal such that all modules 231, 232, . . . 238 of the pixel register 23 are to be selected, color information data successively supplied from the pixel-unit color information data input bus 4*b* may be written into the block memory 13.

On the contrary, in a state where the reading decoder 6*a* generates a decode signal such that all the modules 231, 232, . . . 238 of the pixel register 23 are to be selected, color information data read out from the block memory 13 may be taken out through the pixel-unit color information data output buses 2*a*, 2*b*.

In the foregoing, the description is made of only the case where all the modules 231, 232, . . . 238 of the pixel register 23 are selected. However, when only some modules of any one of the pixel registers are selected, there may be executed a processing equivalent to the pixel mode operation in which access is made, for every pixel, to the block memory concerned. Alternatively, when only necessary modules are selected out of all the modules of some of the pixel registers, there may be executed a processing equivalent to the fill-in mode operation in which access is made to the block memories concerned for only the pixels of the modules thus selected.

In short, the image memory unit is divided into a plurality of block memories, for each of which one of the pixel registers and one of the timing control circuits are provided. Accordingly, pixel data may be written into the image memory unit without interrupting the linear interpolation operation of the DDA, not only when the address data successively supplied from the DDA are those for the vectors in the scanning line direction, but also when the address data successively supplied from the DDA are those for the vectors inclined with respect to the scanning lines. Thus, the drawing operation may be carried out at a considerably high speed.

Also, when reading pixel data from the image memory unit, pixel data on arbitrary vectors may be read out without interrupting the generation of address data by the DDA. The pixel data thus read out may undergo a raster operation, and the resultant data may be written into the image memory unit at a high speed in the same manner as above-mentioned. It is therefore possible to execute the bitblt processing in a bit map display merely by suitably selecting the modules concerned constituting the pixel registers concerned, based on the decode signals. Further, the bitblt processing speed may be improved to the extent equal to about a half of the DDA linear interpolation operation speed.

A pair of pixel registers may be disposed for each of the block memories. Such arrangement makes it possible that, for example, while pixel data are being written into one of pixel registers forming a pair, the pixel data held in the other pixel register of the pair are collectively supplied. Thus, when carrying out a memory access with respect to pixels for the vectors in the scanning line direction, the entire processing speed may be further improved.

Each of the pixel registers disposed for each of the block memories may be used as a pixel data writing register and as a pixel data reading register, as necessary. However, each of the block memories may have two pixel registers such that one is adapted to be exclusively used for pixel data writing and the other is adapted to be exclusively used for pixel data reading.

At the time when the bitblt processing is selected, there may be jointly used a texture mapping algorithm in which pixel data on source vectors are projected on destination vectors. In this case, a scaling or rotating processing may also be easily executed.

In the timing control circuits above-mentioned, the pixel registers may be switched or selected based on variations of the contents of specific digits of the address data supplied from the DDA 4. Such detection may be readily made in an arrangement in the form of a pipeline in which data supplied from the DDA 4 are successively supplied to a register 51 and then a register 52.

This will be described in more detail with reference to FIG. 6.

D-type flip-flops (hereinafter referred to as D-FFs) are used as the registers 51, 52. The contents of the lth digit of data supplied from the DDA adder 4*c* may be supplied to a D-input terminal of the first-stage D-FF 51, and a Q-output signal may be supplied from the first-stage D-FF 51 to a D-input terminal of the second-stage D-FF 52, and a DDA clock signal may be supplied to timing input terminals of both D-FFs 51, 52. When the arrangement above-mentioned is used, there are obtained Q-output signals al, bl, and output signals $\overline{a}$l, $\overline{b}$l from both D-FFs 51, 52. The signals bl and $\overline{a}$l thus obtained are supplied to an AND gate 53, and the signals $\overline{a}$l and $\overline{b}$l are supplied to an AND gate 54. Output signals from both AND gates 53, 54 are supplied to a NOR gate 55. Thus, there is generated a detection flag for detecting a change in the contents of a specific digit.

Figure 7:
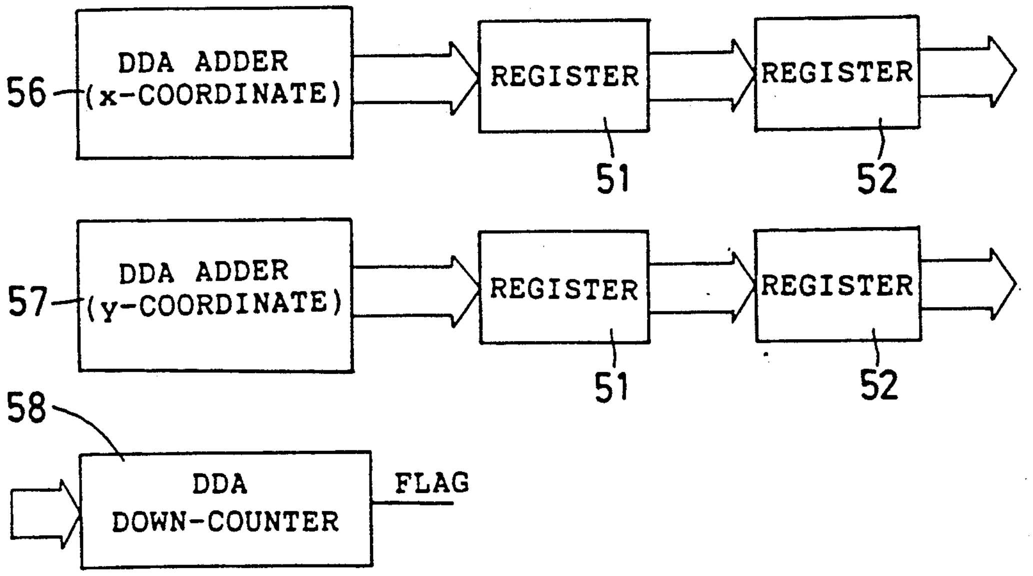
FIG. 7 is a schematic block diagram showing a pair of DDAs in the form of a pipeline.

FIG. 7 is a schematic block diagram in which, only when the lower digits of y-coordinate data have predetermined contents, there are detected:

(i) a change in the contents of the least significant digit of the y-coordinate data;

(ii) a change in the contents of a digit located in an upper position by a predetermined number of digits from the least significant digit of x-coordinate data; and (iii) the completion of line segment, drawing.

Figure 8:
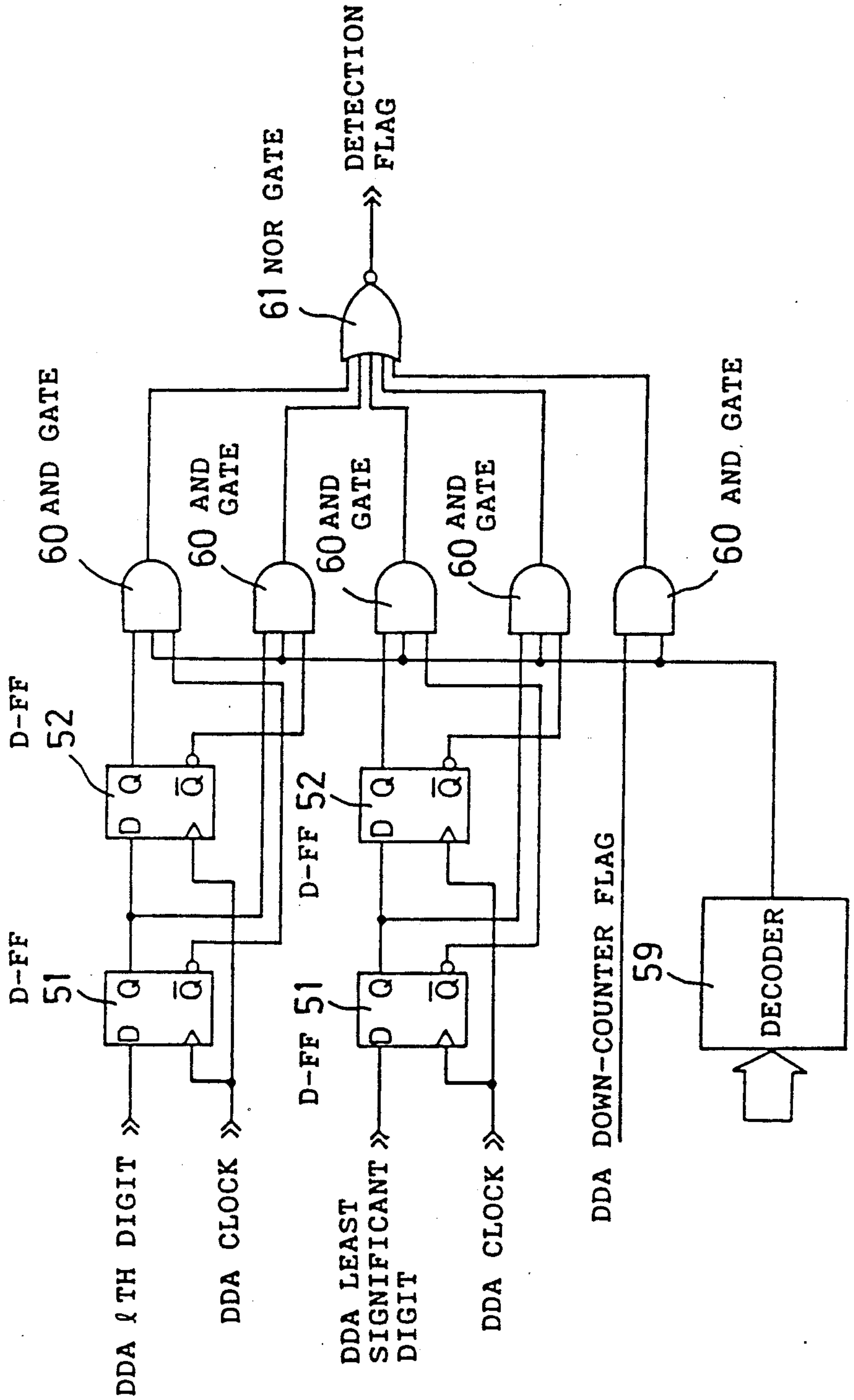
FIG. 8 is a block diagram of another exemplary circuit arrangement for detecting variations of the contents of a specific digit of address data.

FIG. 8 shows further detail corresponding to the block diagram in FIG. 7.

Figure 6:
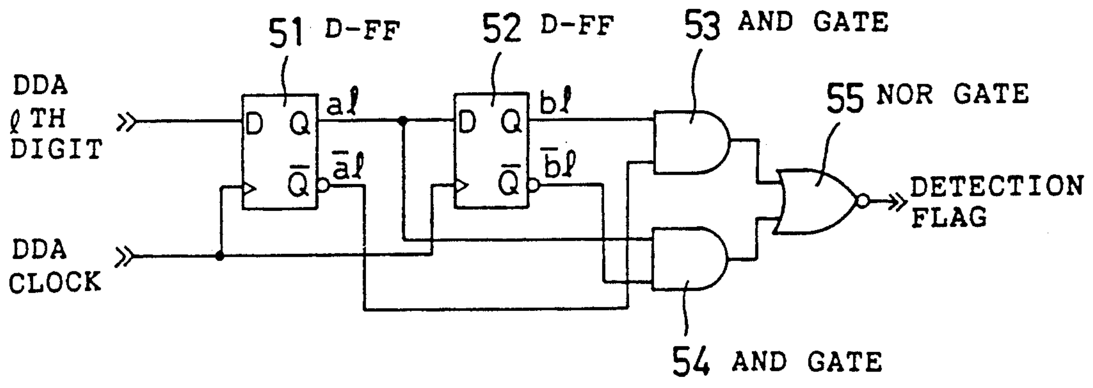
FIG. 6 shows a circuit arrangement suitable for detecting variations of the contents of a specific digit of address data.

In FIGS. 7 and 8, data supplied from a DDA adder 56 for the x-coordinate and a DDA adder 57 for the y-coordinate are respectively supplied to circuits each having the same arrangement as that in FIG. 6. An AND gate 60 is adapted to receive:

(i) a flag from a DDA down-counter 58 (an overflow flag which becomes high when the contents of the down-counter 58 are zero); and (ii) a signal from a decoder 59 which becomes high when the contents of lower digits of the y-coordinate data supplied from the DDA represent the block memory concerned.

The signal supplied from the decoder 59 is supplied to all the AND gates, and signals from all the AND gates are supplied to a NOR gate 61.

In the arrangement above-mentioned, when the output signal from the decoder 59 is in the high level, the NOR gate 61 supplies a pixel register switching timing detection flag in negative logic, according to the change in the contents of the least significant digit of the y-coordinate data, the change in the contents of a predetermined digit of the x-coordinate data and the completion of line segment drawing.

The decoder and AND-OR-INVERTER shown in FIG. 8 may be easily made in the form of PAL (Programmable Alley Logic).

Figure 9:
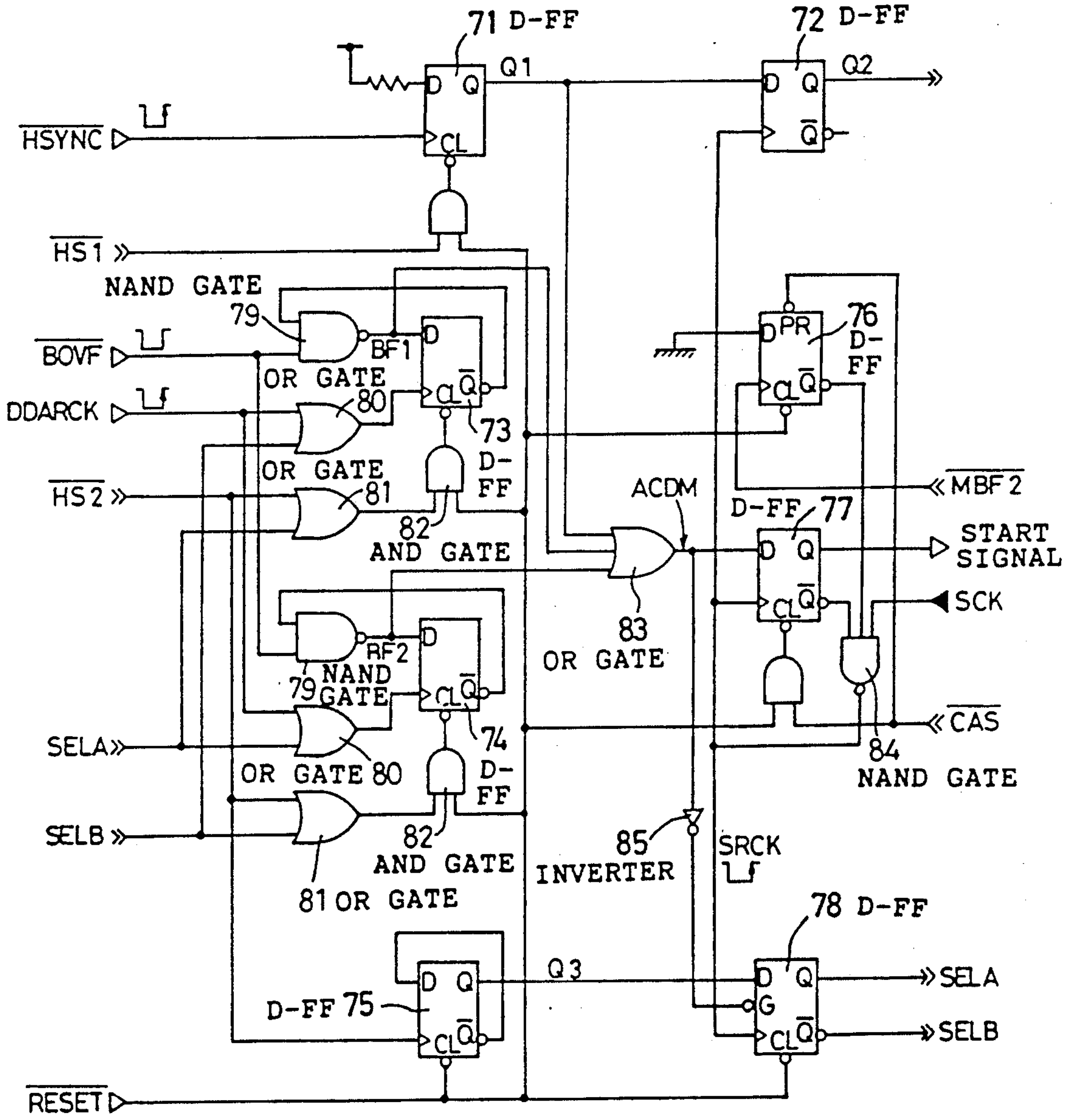
FIG. 9 is a diagram of a circuit arrangement for achieving the timing control of a dynamic random access memory (hereinafter referred to as a DRAM) and a pixel register changeover, based on a pixel register switching timing detection flag.

FIG. 9 shows a circuit arrangement for achieving the timing control of the DRAMs serving as the block memories and the pixel register switching without interrupting the DDAs, based on the pixel register switching timing detection flag generated in the circuit arrangement shown in FIG. 8. In FIG. 9, eight D-FFs 71 to 78 are used.

Figure 10:
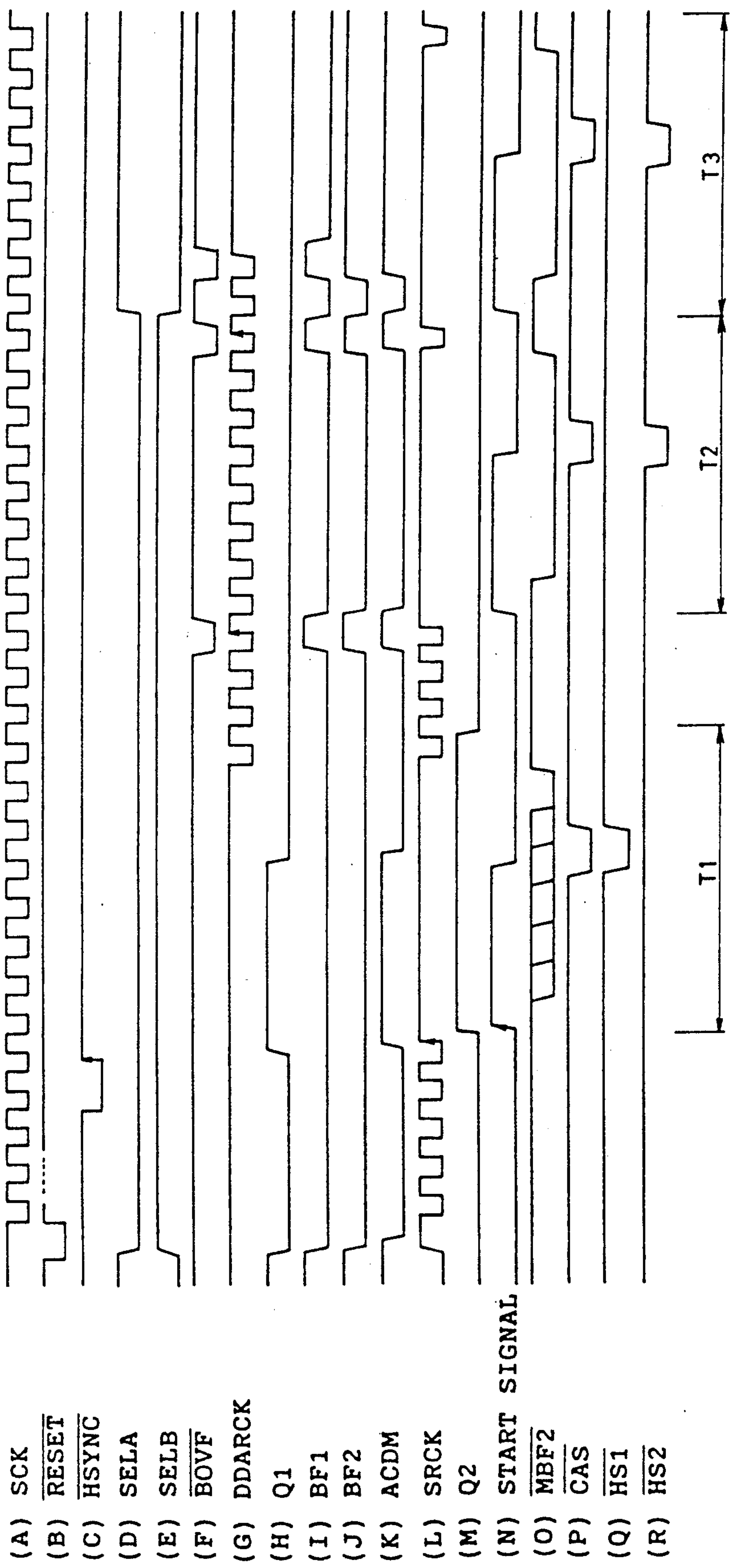
FIG. 10 is a timing chart illustrating the operation of the circuit arrangement in FIG. 9.

The D-FF 71 receives:

(i) a horizontal synchronizing signal $\overline{HSYNC}$ supplied from a CRT controller (not shown) (See FIG. 10 (C)), as a timing signal; and (ii) a hand shake signal $\overline{HS1}$ presenting whether or not read transfer/refresh has been accepted (See FIG. 10 (Q)), as a clear signal.

Upon reception of the signals above-mentioned, the D-FF 71 generates a Q-output signal Q1 presenting whether or not a request for a DRAM read transfer or refresh has been made (See FIG. 10 (H)). The Q-output signal Q1 is, as it is, supplied to a D-input terminal of the D-FF 72 which receives a sampling strobe signal SRCK (See FIG. 10 (L)), as a timing signal. In turn, the D-FF 72 generates a Q-output signal Q2 presenting whether this is a DRAM write cycle or a DRAM read transfer/-refresh cycle (See FIG. 10 (M)).

The D-FFs 73, 74 are disposed for holding a pixel register switching timing detection flag $\overline{BOVF}$ (See FIG. 10 (F)). The D-FFs 73, 74 are operated selectively but in the same manner. More specifically, each of the D-FFs 73, 74 has a D-input terminal to which the pixel register switching timing detection flag $\overline{BOVF}$ is supplied through a NAND gate 79 which receives a Q-output signal from each of the D-FFs 73, 74, as a control signal. Each of the D-FFs 73, 74 has a timing input terminal to which a DDA pixel strobe signal DDARCK of which level varies for every pixel (See FIG. 10 (G)), is supplied through an OR gate 80. Each of the D-FFs 73, 74 has a clear input terminal to which supplied is a negative-logic hand shake signal $\overline{HS2}$ which represents that the memory write cycle has been accepted (See FIG. 10 (R)), through an OR gate 81 and an AND gate 82. For one D-FF, a Q-output signal SELA (See FIG. 10 (D)) and a $\overline{Q}$-output signal SELB (See FIG. 10 (E)) both supplied from the D-FF 78 are respectively supplied to the OR gates 80 and 81. For the other D-FF, the Q-output signal SELA and the $\overline{Q}$-output signal SELB both supplied from the D-FF 78 are respectively supplied to the OR gates 81 and 80.

Accordingly, the pixel register switching timing detection flag $\overline{BOVF}$ is fetched, provided that there is selected, as a data holding flip-flop, the D-FF for which the Q-output signal SELA and the $\overline{Q}$-output signal SELB in the low level are supplied to the OR gate 80, and that the DDA pixel strobe signal DDARCK rises. However, the pixel register switching timing detection flag $\overline{BOVF}$ is supplied through the NAND gate 79 controlled by the $\overline{Q}$-output signal [See signals BF1 and BF2 (FIGS. 10 (I) and (J))]. Accordingly, the pixel register switching timing detection flag $\overline{BOVF}$ is simultaneously supplied both to the D-input terminal and to an OR gate 83, to be discussed later, according to timing at which a pixel register full state is about to take place. The pixel register switching timing detection flag $\overline{BOVF}$ is then held as it is.

The D-FF 75 is disposed for generating a Q-output signal Q3 for the next pixel register switching state. The D-FF 75 has a D-input terminal to which a $\overline{Q}$-output signal is supplied, and a timing input terminal to which the negative-logic hand shake signal $\overline{HS2}$ is supplied.

The D-FFs 76, 77 are disposed for generating a sampling strobe signal SRCK which is synchronous with the clock, without generating a glitch. The D-FF 76 has a timing input terminal to which is supplied a negative-logic pulse signal $\overline{MBF2}$ (FIG. 10 (O)) presenting that the sequence is 2 clocks before the memory cycle is finished. The D-FF 76 also has a preset input terminal to which is supplied a negative-logic pulse signal $\overline{CAS}$ that is always generated once in the memory cycle [for example, a DRAM column address strobe signal (See FIG. 10 (P))]. The D-FF 77 has a D-input terminal to which are supplied:

(i) the Q-output signal Q1 from the D-FF 71; and (ii) signals from the NAND gates 79 for the D-FFs 73, 74, through the OR gate 83.

A NAND gate 84 receives $\overline{Q}$-output signals of the D-FFs 76, 77, and a sampling clock signal SCK (See FIG. 10 (A)). In turn, the NAND gate 84 supplies a sampling strobe signal SRCK. The signal SRCK is also supplied to the timing input terminal of the D-FF 77. The negative-logic pulse signal $\overline{CAS}$ is supplied to a clear input terminal of the D-FF 77. The Q-output signal of the D-FF 77 is supplied as a start signal (See FIG. 10 (N)) whose rise represents the start of the memory cycle.

The D-FF 78 is disposed for supplying the pixel register switching signals SELA, SELB as the Q-output signal and $\overline{Q}$-output signal, respectively. The D-FF 78 has a D-input terminal to which the Q-output signal Q3 of the D-FF 75 is supplied, and a timing input terminal to which the sampling strobe signal SRCK is supplied. The D-FF 78 has also a G-input terminal to which an output signal ACDM (See FIG. 10 (K)) from the OR gate 83 is supplied through an inverter 85.

Accordingly, the Q-output signal from the D-FF 75 is held at such timing that the signal supplied to the G-input terminal is low and that the sampling strobe signal SRCK rises. According to the level of this Q-output signal, the D-FF 78 continuously supplies the Q-output signal SELA and the $\overline{Q}$-output signal SELB of which levels are opposite to each other.

A negative-logic initialization signal $\overline{RESET}$ (See FIG. 10 (B)) is supplied to each of the clear input terminals of the D-FF 71 to 78.

The following description will discuss the operation of the circuit shown in FIG. 9.

When the power is turned ON or when the processing is started with the use of the apparatus of the present invention, a necessary initialization is made by an initialization signal $\overline{RESET}$.

Afterwards, the Q-output signal Q3 of the D-FF 75 alternately varies in level each time the negative-logic hand shake signal $\overline{HS2}$ supplied to the timing input terminal of the D-FF 75. Accordingly, the D-FF 78 holds the Q-output signal Q3 at such timing that a low-level signal is supplied to the G-input terminal of the D-FF 78 and that the sampling strobe signal SRCK rises. Thus, the D-FF 78 supplies the Q-output signal SELA and the $\overline{Q}$-output signal SELB according to the level of the Q-output signal Q3. Either one of the D-FF 73, 74 is selected based on the levels of the Q-output signal SELA and $\overline{Q}$-output signal SELB. That is, there is selected the D-FF for which the OR gate 80 has received a low-level signal.

The selected D-FF receives, as the D-input signal, the pixel register switching timing detection flag $\overline{BOVF}$ through the NAND gate 79 controlled by the Q-output signal. This D-FF also receives, as the timing input signal, the DDA pixel strobe signal DDARCK through the OR gate 80. Accordingly, this D-FF fetches the pixel register switching timing detection flag $\overline{BOVF}$, at the rise timing of the DDA pixel strobe signal DDARCK. The pixel register switching timing detection flag $\overline{BOVF}$ is then held as it is. The pixel register switching timing detection flag $\overline{BOVF}$ is not taken out from the Q-output terminal of this D-FF, but it is taken out, as it is, from the output terminal of the NAND gate 79. Accordingly, the pixel register switching timing detection flag $\overline{BOVF}$ is supplied to the OR gate 83 at the timing that the pixel register full state is generated, without any delay for one-pixel data. The pixel register switching timing detection flag $\overline{BOVF}$ is then supplied to the D-input terminal of the D-FF 77. Thus, the D-FF 77 supplies, from the Q-output terminal thereof, the start signal representing that the memory cycle starts.

Each time the negative-logic hand shake signal $\overline{HS2}$ is supplied to the timing input terminal of the D-FF 75, the selection of the D-FFs 73, 74 is switched, and a series of the operations above-mentioned will be carried out.

FIG. 10 is a timing chart illustrating the operations of the respective units in the circuit shown in FIG. 9.

In FIG. 10, there are carried out an image data read/transfer operation in a period of time T1, and an image data write operation in periods of time T2 and T3.

Accordingly, when the timing control circuit having the arrangement shown in FIGS. 8 and 9 is disposed for each block memory, the image memory data processing may be controlled by successively carrying out operations of reading and writing data from and into the image memory unit 1, without interrupting the arithmetic operation of the DDA 4. That is, for any source vectors and any destination vectors, without any influence by the inclination thereof, the mapping processing may be executed in the image memory unit 1 in a period of time equal to that required for arithmetic operation of the DDA 4, when consideration is made for one-pixel data.

In the embodiment above-mentioned, when a dual-port DRAM is used as the DRAM, the time required for reading data to be displayed may be considerably shortened. This allows 98% of the entire processing time to be used for data writing. As a whole, the time required for writing data into the image memory unit may be shortened FIG. 11 (A) is a block diagram of the image memory data processing control apparatus in accordance with a second embodiment of the present invention.

In FIG. 11 (A), an image memory unit 100 is divided into a plurality of block memories 111, 112, . . . 11*m*, for each of which each of pixel registers 121, 122, . . . 12*m* and each of timing control circuits 131, 132, . . . 13*m* are disposed. Based on control signals supplied from the timing control circuits, the transmission and reception of pixel data may be made between the pixel registers concerned and the corresponding block memories. Each of the pixel registers has n modules in the scanning line direction.

The apparatus in FIG. 11 (A) has a plurality of DDAs 141, 142, . . . 14*k* adapted to receive address data of the end points of filling line segments in the scanning line direction to execute a linear interpolation operation, thereby to successively generate address data for the image memory unit. The apparatus also has a plurality of DDAs 141*a*, 142*a*, . . . 14*ka* adapted to execute a linear interpolation operation synchronously with the operations of the DDAs 141, 142, . . . 14K, thereby to generate color information data.

Timing control circuits 131, 132, . . . 13*m* are disposed for decoding address data supplied from the DDAs 141, 142, . . . 14*k* to generate control signals. The address data above-mentioned are also supplied to writing decoders 151*a*, 152*a*, . . . 15*ka*, thereby to generate writing selection signals, each of which corresponds to each of (m×n) modules. The address data above-mentioned are supplied to reading decoders 161*a*, 162*a*, . . . 16*ka* through FIFO memories 161*b*, 162*b*, . . . 16*kb*, thereby to generate reading selection signals, each of which corresponds to each of the (m×n) modules.

Pixel-unit color information data read out to the pixel registers 121, 122, . . . 12*m* from the block memories 111, 112, . . . 11*m*, may be supplied to SRAMs 171, 172, . . . 17*k* serving as pixel data temporarily holding means, through data buses 121*a*, 122*a*, . . . 12*ma* including n data lines (generally referred to as a data bus 2*a*) and through a buffer (not shown). Supply of address data to the SRAMs 171, 172, . . . 17*k* may be made by up-counters 171*a*, 172*a*, . . . 17*ka* of which contents are incremented synchronously with the generation of address data by the DDAs 141, 142, . . . 14*k*. Accordingly, such data may be stored, in the read order, into the SRAMs 171, 172, . . . 17*k*, and the data thus stored may be read out in the storage order.

Data read out from the SRAMs 171, 172, . . . 17*k* may be supplied to a barrel bus shifter 170 comprising a predetermined number of barrel shifters connected in parallel with one another, and then collectively shifted by an amount corresponding to the number of bits which corresponds to the shift in scanning line between the source data and the destination data.

Figure 12:
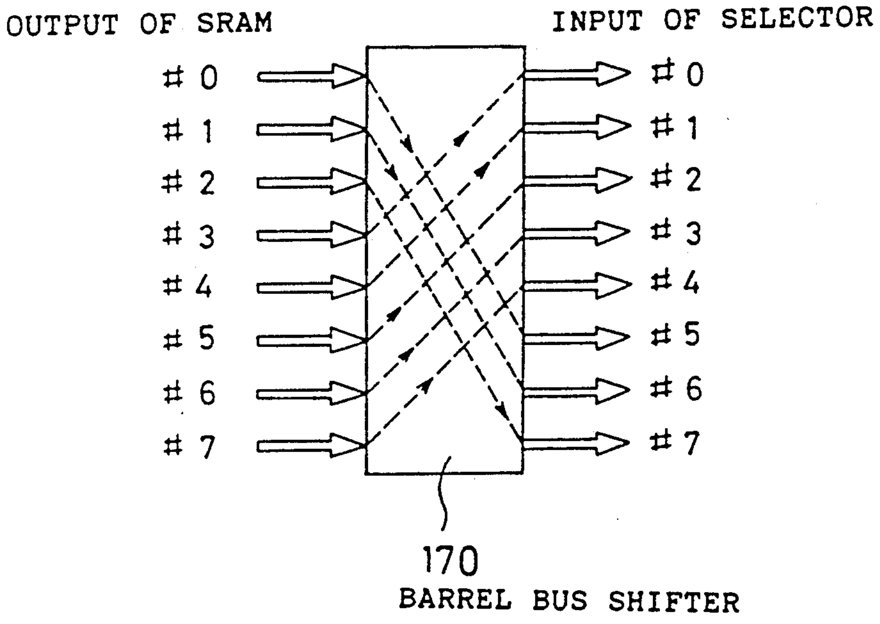
FIG. 12 is useful in illustrating the operation of a barrel bus shifter.

Color information data generated by the DDAs 141*a*, 142*a*, . . . 14*ka* and color information data supplied by the barrel bus shifter 170 may be supplied to selectors 181, 182, . . . 18*k* (See FIG. 12). Data selected by the selectors 181, 182, . . . 18*k* may be supplied, as controlled by the timing control circuits 131, 132, . . . 13*m*, to the pixel registers 121, 122, . . . 12*m*.

The arrangement and operation of the modules constituting the pixel registers in FIG. 11 (A) are the same as those shown in FIGS. 2 and 3. The description thereof is therefore omitted here.

The following description will discuss the operation of the image memory data processing control apparatus having the arrangement above-mentioned.

When merely writing pixel data, the writing decoders 151*a*, 152*a*, . . . 15*ka* and the reading decoders 161*a*, 162*a*, . . . 16*ka* may be inhibited from being operable, and the selectors 181, 182, . . . 18*k* may be so switched as to select data supplied from the DDAs 141*a*, 142*a*, . . . 14*ka*.

In such state, when the DDAs 141, 142, . . . 14*k* successively generate address data, based on the x- and y-coordinate values the timing control circuits 131, 132, . . . 13*m* generate control signals and select only pixel registers corresponding to the address data generated. Accordingly, pixel-unit color information data generated by the DDAs 141*a*, 142*a*, . . . 14*ka* operable synchronously with the DDAs 141, 142, . . . 14*k*, may be supplied to the modules concerned of the pixel registers selected.

When the data supply to the pixel registers concerned is made to the utmost limit, or when the y-coordinate values undergo a change, all color information data held by the pixel registers above-mentioned are collectively written into the image memory unit 100. Thus, the data writing speed may be improved when consideration is made for one-pixel data. While data are being written from the pixel registers concerned into the image memory unit 100, pixel-unit color information data which are being continuously supplied from the DDAs 141*a*, 142*a*, . . . 14*ka*, may be supplied to other pixel registers.

It is therefore possible to write color information data into the image memory unit 100 without interrupting the linear interporation operations by the DDAs 141, 142, . . . 14*k* and 141*a*, 142*a*, . . . 14*ka*. Thus, the entire drawing speed may be made higher than the DDA operating speed. That is, the increase in the number of the DDAs increases the number of pixel data to be simultaneously generated. Thus, the drawing speed may be accordingly improved.

When executing the bitblt processing, the writing decoders 151*a*, 152*a*, . . . 15*ka* and the reading decoders 161*a*, 162*a*, . . . 16*ka* may be so set as to be operable and the selectors 181, 182, . . . 18*k* may be so switched as to select data read out from the SRAMs 171, 172, . . . 17*k*.

In such state, when, based on address data of the end points of line segments in the scanning line direction in the source area, the DDAs 141, 142, . . . 14*k* successively generate address data for source vectors, the timing control circuits 131, 132, . . . 13*m* generate control signals based on the x- and y-coordinate values. Thus, the block memories concerned are selected. Then, pixel data concerned of the block memories thus selected may be read out. Supplied to the reading decoders 161*a*, 162*a*, . . . 16*ka* are the address data as delayed by the required time for reading by the FIFO memories 161*b*, 162*b*, 16*kb*. The reading decoders 161*a*, 162*a*, . . . 16*ka* supply module selection signals according to the source area to be used and the type of the bitblt processing to be executed. The read data are therefore held by the selected modules only. The read data thus held are then temporarily held, in the read order, by the SRAMs 171, 172, . . . 17*k* through the data buses 121*a*, 122*a*, . . . 12*ma* and buffers (not shown). In this case, the address data of the SRAMs 171, 172, . . . 17*k* are incremented by the upcounters 171*a*, 172*a*, . . . 17*ka* synchronously with the operations of the DDAs 141, 142, . . . 14*k*. In the barrel bus shifter 170 which is constituted by barrel shifters for shifting data read out from each of the SRAMs 171, 172, . . . 17$k$, there is set a shift amount corresponding to the number of bits by which the data read out from each of the SRAMs 171, 172, . . . 17$k$ are to be shifted. The shift amount is determined based on the difference between the y-coordinate value ys of a line segment in the source area and the y-coordinate value yd of the corresponding line segment in the destination area.

After the data of one line segment in the scanning line direction in the source area have been read out in the manner above-mentioned, address data of the end points of the line segments (which correspond to the line segments in the source area) in the scanning line direction in the destination area are supplied to the DDAs 141, 142, . . . 14$k$. Then, successively generated are address data on the corresponding line segments in the scanning line direction in the destination area. The address data thus generated are supplied to the timing control circuits 131, 132, . . . 13$m$ and the writing decoders 151$a$, 152$a$, . . . 15$ka$. Accordingly, based on the x- and y-coordinate values, the timing control circuits 131, 132, . . . 13$m$ generate control signals for selecting the pixel registers concerned and the block memories concerned. The writing decoders 151$a$, 152$a$, . . . 15$ka$ supply module selection signals according to the destination area to be used and the type of the bitblt processing to be executed. Thus, the written data are held by the selected modules only.

The writing data thus held undergo a raster operation by the operation unit 92 shown in FIG. 2, and the resultant data are then written into the block memories concerned through the bidirectional buffer 93 shown in FIG. 2.

Figure 13:
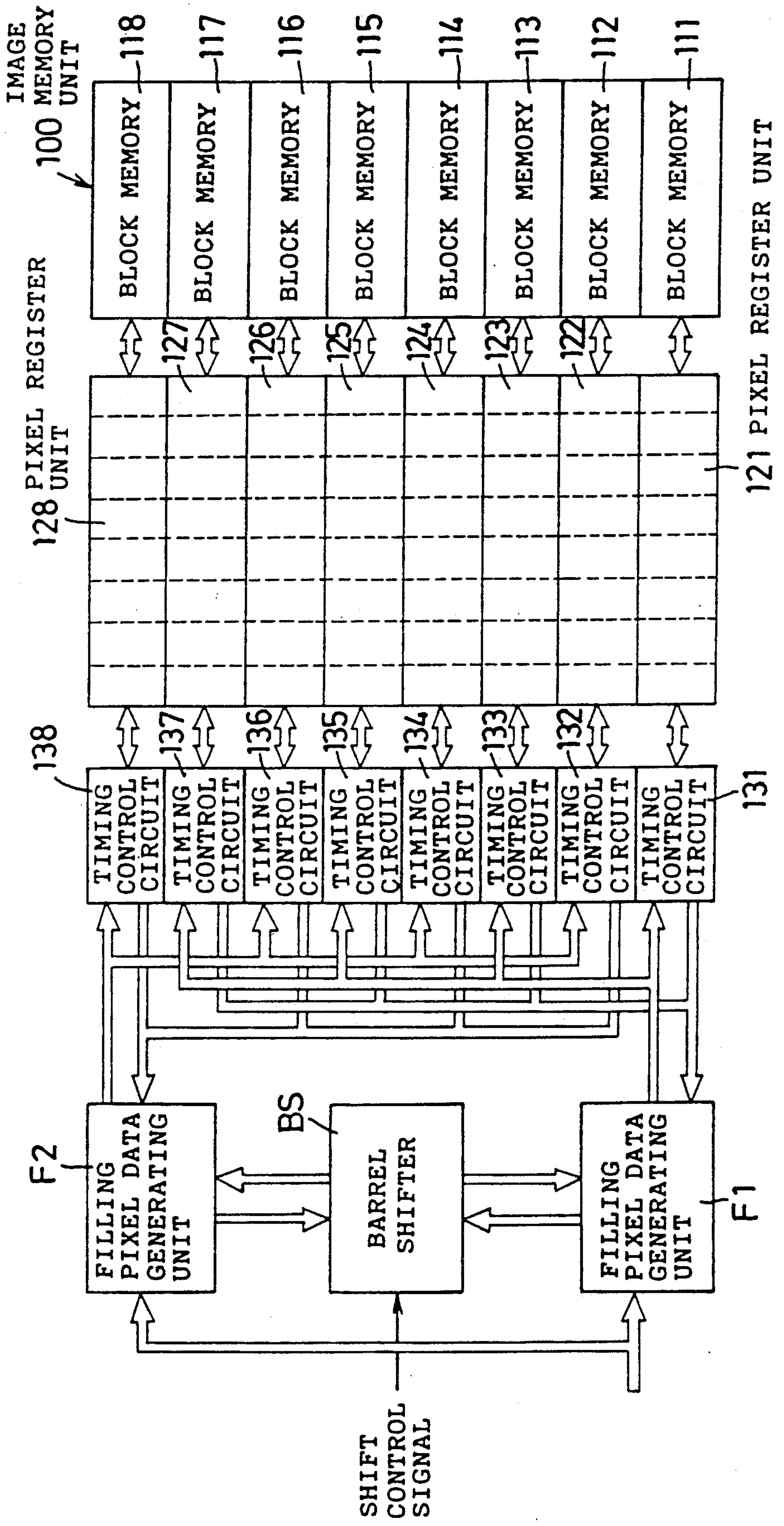
FIG. 13 is a schematic block diagram of an example of the apparatus shown in FIG. 11.

FIG. 13 is a schematic block diagram of an example of the apparatus showin in FIG. 11 (A).

In this example, k representing the number of the DDAs is set to 2, and both the division number m of the image memory unit and the number of the modules n of each pixel register are set to 8.

In this example, there are disposed two filling pixel data generating units F1 and F2, and a barrel shifter BS between both units F1 and F2. One filling pixel data generating unit F1 is disposed for timing control circuits 131, 133, 135, 137, pixel registers 121, 123, 125, 127 and block memories 111, 113, 115, 117 which are all located at the positions having even numbers. The other filling pixel data generating unit F2 is disposed for timing control circuits 132, 134, 136, 138, pixel registers 122, 124, 126, 128 and block memories 112, 114, 116, 118 which are all located at the positions having odd numbers.

The filling pixel data generating units are so arranged as to include the address data generating DDAs, the color information data generating DDAs, the read data temporarily holding SRAMs, the up-counters for supplying address data to the SRAMs, the y-coordinate shifting barrel bus shifter and the selectors shown in FIG. 11 (A).

In the example above-mentioned, the end-point data of line segments on the scanning lines having even numbers are supplied to the filling pixel data generating unit F1, while the end-point data of line segments on the scanning lines having odd numbers are supplied to the filling pixel data generating unit F2. The units F1 and F2 generate filling address data and color information data. The address data thus generated are supplied to the timing control circuits concerned, which, in turn, generate control signals to select the pixel registers concerned and the block memories concerned.

When merely executing a drawing operation, it is sufficient to write the color information data into the block memories selected, according to the address data. Data generation is simultaneously made in both filling pixel data generating units, and data writing is made to the block memories concerned through the pixel registers concerned. This enables the drawing operation to be carried out at a speed higher than the DDA linear interpolation operating speed, when consideration is made for one-pixel data.

When executing the bitblt processing, address data for different line segments in the scanning line direction in the source area are generated successively and simultaneously. The address data thus generated are supplied to the block memories concerned. Accordingly, the color information data of the pixels on the line segments above-mentioned are read out successively and simultaneously through the pixel registers concerned. The color information data thus read out are supplied to the pixel registers concerned, synchronously with the generation of address data of the line segments in the scanning line direction in the destination area. The data thus supplied undergo a raster operation in the modules constituting the pixel registers concerned, and the resultant data are then written into the destination area.

However, when the scanning lines having even numbers and odd numbers in the source area are respectively corresponding to the scanning lines having even numbers and odd numbers in the destination area, the color information data read out may be supplied, as they are, from the filling pixel data generating units concerned. This enables the bitblt processing to be executed without any inconvenience.

On the contrary, when the scanning lines having even numbers and odd numbers in the source area are not respectively corresponding to the scanning lines having even numbers and odd numbers in the destination area, the color information data held by the filling pixel data generating units concerned may be supplied to the barrel shifter BS. Then, the scanning lines having odd numbers are replaced with the scanning lines having even numbers. Then, the color information data held in the filling pixel data generating units concerned may be supplied. Thus, the bitblt processing may be executed with the shift in scanning line eliminated.

In this processing, the color information data may be read out successively and simultaneously, and the color information data thus read out may be written successively and simultaneously, without interrupting the DDA linear interpolation operation. Thus, the bitblt processing speed may be improved by more than a half of the DDA linear interpolation operating speed.

Figure 14:
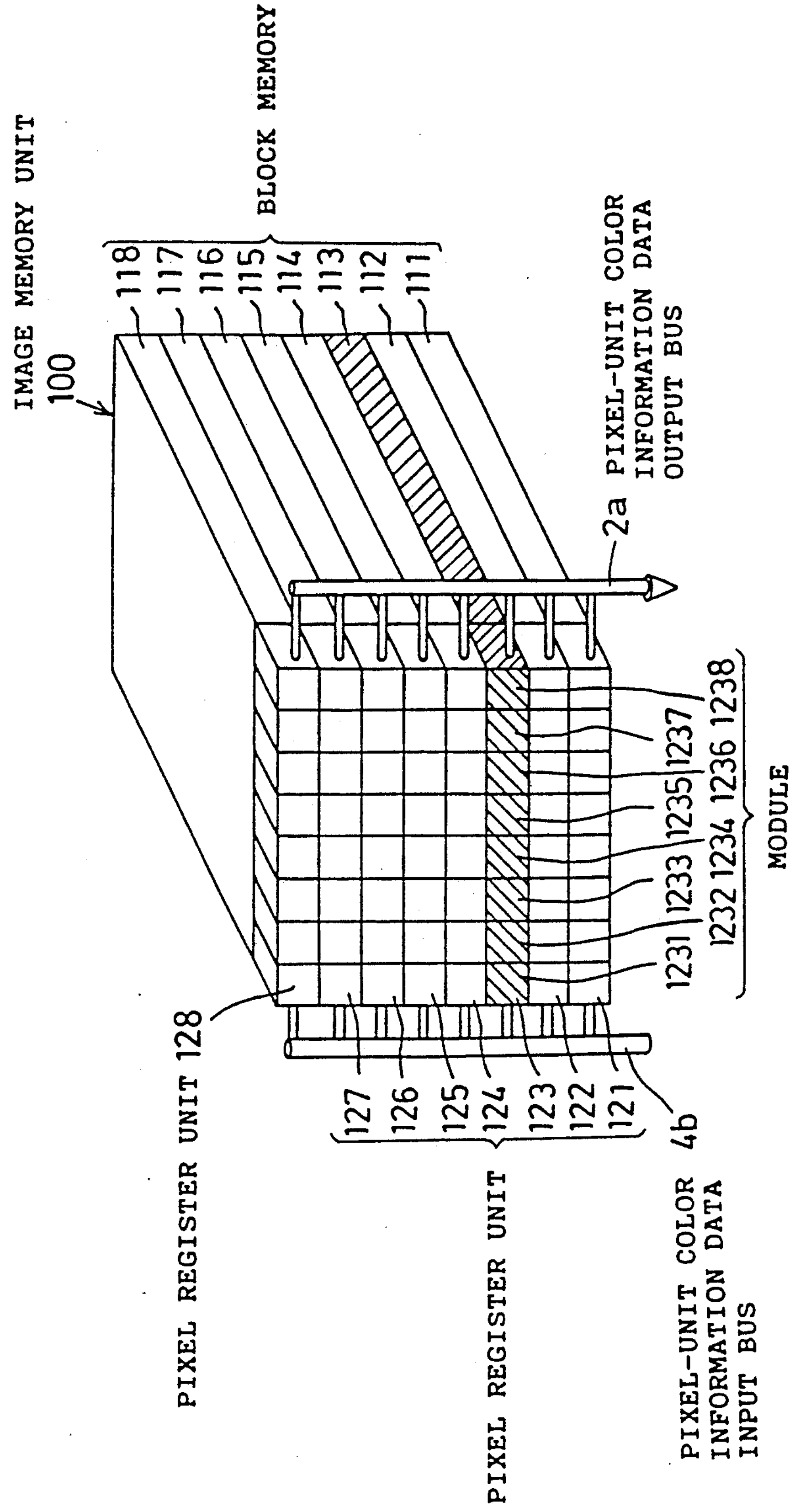
FIG. 14 illustrates the relationship between the modules constituting pixel registers and an image memory unit.
Figures 15A, 15B, 15C:
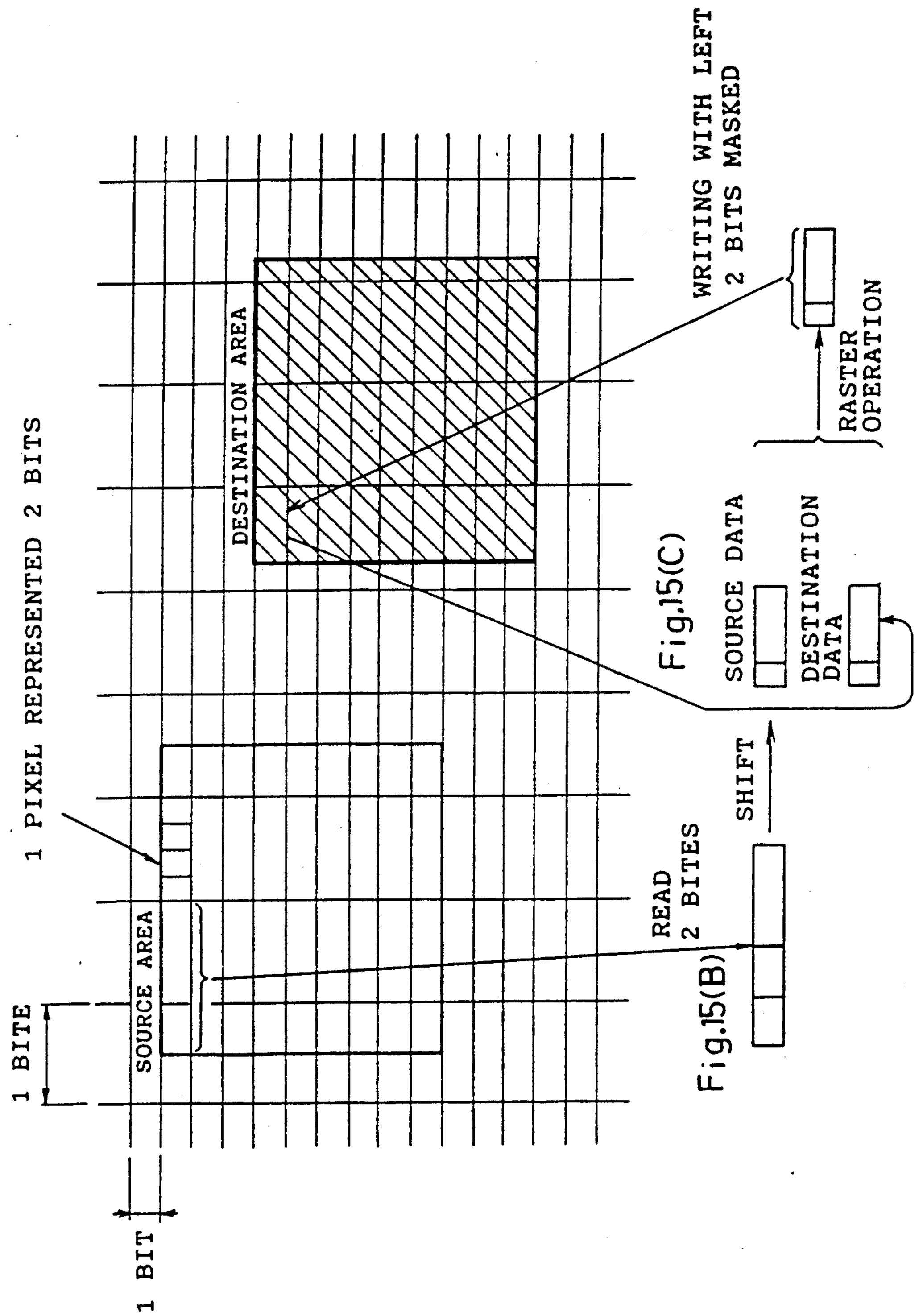
FIG. 15 is useful in illustrating a bitblt processing.

FIG. 14 is a view schematically illustrating a relationship between the modules constituting the pixel registers and the image memory unit 100.

The image memory unit 100 is divided into eight block memories 111, 112, . . . 118, and each of eight pixel registers 121, 122, . . . 128 is constituted by eight modules. That is, each of m and n mentioned earlier is here set to 8.

Connected to each of the pixel registers are a pixel-unit color information data input bus 14$ib$ and a pixel-unit color information data output bus 12$ia$ (where "i" is an arbitrary natural number which represents a line concerned of the input/output buses, which are generally referred to as 4$b$ and 2$a$, respectively).

Accordingly, in a state where the writing decoders (See FIG. 11(A)) have generated a decode signal such that all modules 1231, 1232, . . . 1238 of the pixel register 123 are to be selected, color information data successively supplied from the pixel-unit color information data input bus 4*b* may be written into the block memory 113.

On the contrary, in a state where the reading decoders have generated a decode signal such that all the modules 1231, 1232, . . . 1238 of the pixel register 123 are to be selected, color information data read out from the block memory 113 may be taken out through the pixel-unit color information data output bus 2*a*.

In the foregoing, the description has been made only of the case where all the modules 1231, 1232,.. 1238 of the pixel register 123 are selected. However, when only some modules of any one of the pixel registers are selected, there may be executed a processing equivalent to the pixel mode operation in which access is made, for every pixel, to the block memory concerned. Alternately, when only necessary modules are selected out of all the modules of some of the pixel registers, there may be executed a processing equivalent to the fill-in mode operation in which access is made to the block memories concerned for only the pixels of the modules thus selected.

In short, the image memory unit is divided into a plurality of block memories, for each of which one of the pixel registers and one of the timing control circuits are provided. Accordingly, pixel data may be written into the image memory unit without interrupting the linear interpolation operations of the DDAs. Thus, the drawing operation may be carried out at a considerably high speed.

Also, when reading pixel data from the image memory unit, the pixel data on arbitrary line segments may be read out without interrupting the generation of address data by the DDAs. The pixel data thus read out may undergo a raster operation, and the resultant data may be written into the image memory unit at a high speed in the same manner as above-mentioned. It is therefore possible to execute a processing equivalent to the bitblt processing in a bit map display, merely by suitably selecting, based on decode signals, the modules concerned constituting pixel registers concerned. Further, the bitblt processing speed may be considerably improved.

When the bitblt processing is to be executed, memory access is made for line segments in the scanning line direction. Accordingly, a pair of pixel registers may be disposed for each of the block memories. With such arrangement, it is possible that, for example, while pixel data are being written into one of pixel registers forming a pair, pixel data in the other pixel register may be collectively supplied. Thus, the entire processing speed may be further improved.

Each of the pixel registers disposed for each of the block memories may be used as a pixel data writing register and as a pixel data reading register, as necessary. However, each of the block memories may have two pixel registers, i.e., one adapted to be exclusively used for pixel data writing, and the other adapted to be exclusively used for pixel data reading.

At the time when the bitblt processing is selected, there may be jointly used a texture mapping algorithm in which pixel data on source line segments are projected on destination line segments. In this case, a scaling or rotating processing may be easily executed.

In the timing control circuits above-mentioned, the pixel registers may be switched or selected based on variations of the contents of specific digits of the address supplied from the DDAs 141, 142, . . . 14*k*. Such detection may be made easily and securely by employing the arrangement shown in FIG. 6, FIG. 8 or FIG. 9.

In the embodiment above-mentioned, when a dual-port DRAM is used as the DRAM, the time required for reading data to be displayed may be considerably shortened. This allows 98% of the entire processing time to be used for data writing. As a whole, the time required for writing data into the image memory unit may be shortened.

It is a matter of course that the present invention should not be limited to the embodiments hereinbefore described and illustrated.

Figure 1A:
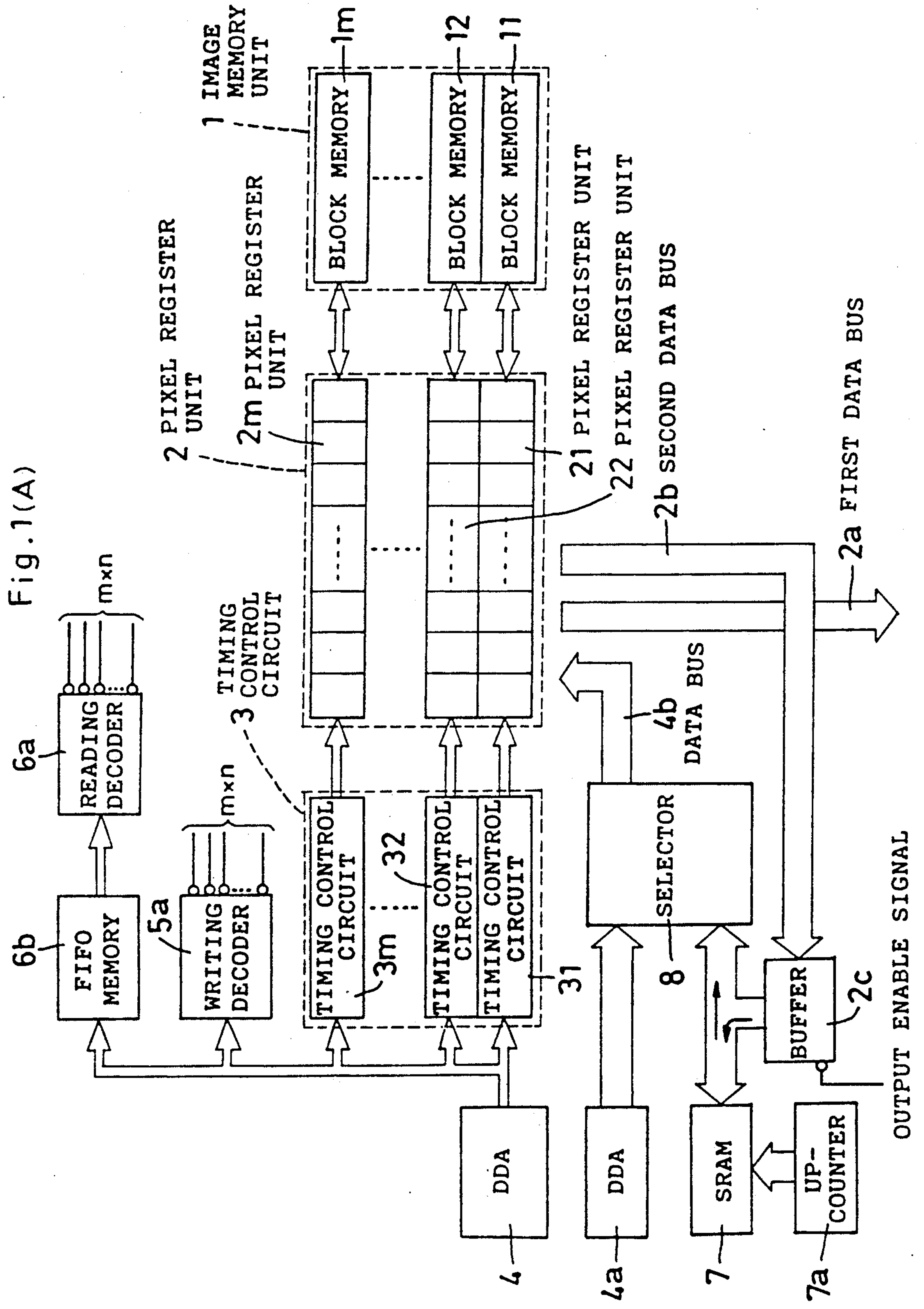
FIGS. 1(A) and 1(B) are the block diagrams of an image memory data processing control apparatus in accordance with a first embodiment of the present invention.
Figure 1B:
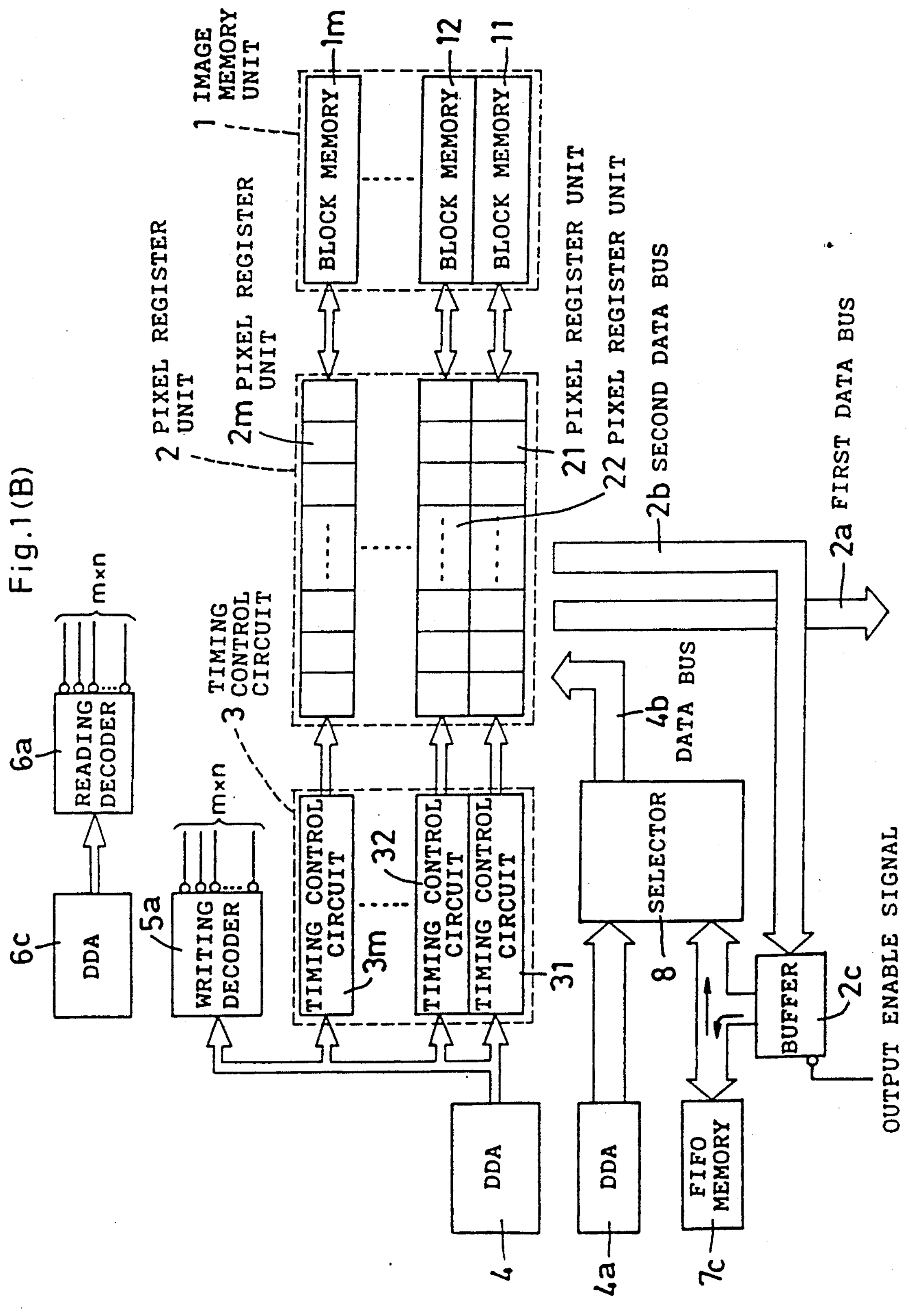

For example, instead of the SRAMs 7, 171, 172 . . . 17K, FIFO memories 7*c*, 171*c*, 172*c*, . . . 17*kc* may be used (See FIGS. 1 (B) and 11 (B)). Instead of the delaying FIFO memories 6*b*, 161*b*, 162*b*, . . . 16*kb*, there may be used other DDAs 6*c*, 161*c*, 162*c*, . . . 16*kc* for generating address data delayed by a predetermined period of time from the DDA data generating time (See FIGS. 1(B) and 11(B)). Further, the number of pixel registers and the number of timing control circuits may be changed. Also, provision may be made such that scaling, rotating or other processing may be executed. Other variations and modifications may be made without departing from the spirit and principle of the present invention.

What is claimed is:

1. An image memory data processing control apparatus comprising:

an image memory unit including a plurality of block memories associated with different scanning lines in a scanning line direction of a display means which displays pixel data supplied from said image memory unit;

a linear interpolation operation unit for generating access address data for said image memory unit and pixel data in any scanning line direction for said display means;

pixel registers, each of which comprises a plurality of modules for holding pixel data that are continuous in the scanning line direction, each of said pixel registers being associated with a corresponding block memory;

timing control means for generating control signals based on access address data supplied from said linear interpolation operation unit, which control signals select said block memories and said pixel registers, each of said timing control means being associated with a corresponding block memory;

write decoding means for generating first module selection signals based on access address data supplied from said linear interpolation operation unit, which first module selection signals sequentially select a first predetermined number of modules of said pixel registers;

delay means for delaying transmission of access address data supplied from said linear interpolation operation unit by a predetermined period of time;

read decoding means for generating second module selection signals based on access address data supplied from said delay means, which second module selection signals sequentially select a second predetermined number of modules of said pixel registers;

pixel data temporary holding means for continuously storing pixel data supplied from modules selected by said read decoding means, along a linear interpolation locus, and for supplying pixel data thus stored to modules selected by said write decoding means, addresses of said pixel data temporary holding means being successively changed in synchronism with operation of said linear interpolation operation unit;

selection means for selectively supplying pixel data generated by said linear interpolation operation unit or pixel data read out from said pixel data temporary holding means; and operation means for executing a raster operation on the condition that pixel data read out from said pixel data temporary holding means have been selected.

2. An image memory data processing control apparatus as set forth in claim 1, wherein said delay means is a FIFO memory.

3. An image memory data processing control apparatus as set forth in claim 1, wherein said pixel data temporary holding means comprises a status random access memory and an up-counter for successively incrementing the address data of said static random access memory.

4. An image memory data processing control apparatus as set forth in claim 1, wherein said pixel data temporary holding means is a FIFO memory.

5. An image memory data processing control apparatus as set forth in claim 1, wherein said timing control means decodes predetermined digits of address data from said linear interpolation operation unit, said predetermined digits representing coordinate data in a direction at a right angle to the scanning line direction, to generate control signals for selecting said pixel registers.

6. An image memory data processing control apparatus as set forth in claim 1, wherein said timing control means generates control signals according to timing determined by a change in the contents of predetermined coordinate data digits of address data from said linear interpolation operation unit.

7. An image memory data processing control apparatus as set forth in claim 7, wherein, as to coordinate data in the scanning line direction, the timing control means generates control signals according to timing determined by a change in the contents of a predetermined lower digit representative of the capacity of said pixel registers, and as to coordinate data in a direction at a right angle to the scanning line direction, said timing control means generates control signals according to timing determined by a change in the contents of the least significant digit.

8. An image memory data processing control apparatus as set forth in claim 1, wherein said image memory unit is a dual-port dynamic random access memory.

9. An image memory data processing control apparatus comprising:

an image memory unit including a plurality of block memories associated with different scanning lines in a scanning line direction of a display means which displays pixel data supplied from said image memory unit;

a first linear interpolation operation unit for generating access address data for said image memory unit and pixel data in any scanning line direction for said display means;

pixel registers, each of which comprises a plurality of modules for holding pixel data that are continuous in the scanning line direction, each of said pixel registers being associated with a corresponding block memory;

timing control means for generating control signals based on access address data supplied from said linear interpolation operation unit, which control signals select said block memories and said pixel registers, each of said timing control means being associated with a corresponding block memory;

writing decoding means for generating first module selection signals based on access address data supplied from said linear interpolation operation unit, which first module selection signals sequentially select a first predetermined number of modules of said pixel registers;

delay means comprising a second linear interpolation operation unit for generating access address data after a delay of a predetermined period of time;

read decoding means for generating second module selection signals based on access address data supplied from said delay means, which second module selection signals sequentially select a second predetermined number of modules of said pixel registers;

pixel data temporary holding means for continuously storing pixel data supplied from said modules selected by said read decoding means, along a linear interpolation locus, and for supplying the pixel data thus stored to modules selected by said write decoding means, addresses of said pixel data temporary holding means being successively changed in synchronism with operation of said second linear interpolation operation unit;

selection means for selectively supplying pixel data generated by said first linear interpolation operation unit or pixel data read out from said pixel data temporary holding means; and operation means for executing a raster operation on the condition that pixel data read out from said pixel data temporary holding means have been selected.

10. An image memory data processing control apparatus comprising:

an image memory unit including a plurality of block memories associated with different scanning lines along a scanning line direction of a display means which displays pixel data supplied from said image memory unit;

a plurality of filling linear interpolation operation units for generating access address data for said image memory unit and pixel data in any scanning line direction for said display means;

pixel registers, each of which comprises a plurality of modules for holding pixel data that are continuous in the scanning line direction, each of said pixel registers being associated with a corresponding block memory;

timing control means for generating control signals based on access address data supplied from said linear interpolation operation units, which control signals select said block memories and said pixel registers, each of said timing control means being associated with a corresponding block memory;

write decoding means for generating first module selection signals based on access address data supplied from said linear interpolation operation units, which first module selection signals sequentially select a first predetermined number of modules of said pixel registers;

delay means for delaying the transmission of access address data supplied from said linear interpolation operation units by a predetermined period of time;

read decoding means for generating second module selection signals based on access address data supplied from said delay means, which second module selection signals sequentially select a second predetermined number of modules of said pixel registers;

a plurality of pixel data temporary holding means for continuously storing pixel data supplied from modules selected by said read decoding means, along a linear interpolation locus, and for supplying pixel data thus stored to modules selected by said write decoding means, addresses of said pixel data temporary holding means being successively changed in synchronism with operation of said linear interpolation operation unit;

shift means adapted to shift pixel data read out from said pixel data temporary holding means by preset shift amounts, said shift amounts being based upon coordinate data defining a direction forming a right angle with the scanning line direction in a source area and based upon coordinate data defining a direction forming a right angle with the scanning line direction in a destination area;

selection means for selectively supplying pixel data generated by said linear interpolation operation units or pixel data read out from said pixel data temporary holding means; and operation means for executing a raster operation on the condition that pixel data read out from said pixel data temporary holding means have been selected.

11. An image memory data processing control apparatus as set forth in claim 10, wherein a plurality of block memories are associated with each of said linear interpolation operation units, and said timing control means selects a state where pixel data generated by each linear interpolation operation unit are successively supplied to different block memories associated with said each linear interpolation operation unit.

12. An image memory data processing control apparatus as set forth in claim 10, wherein the delay means comprises FIFO memories for delaying transmission of address data supplied from said linear interpolation operation units by a predetermined period of time.

13. An image memory data processing control apparatus as set forth in claim 10, wherein said pixel data temporary holding means comprises static random access memories and up-counters for successively incrementing the address data of said static random access memories.

14. An image memory data processing control apparatus as set forth in claim 10, wherein said pixel data temporary holding means are FIFO memories.

15. An image memory data processing control apparatus as set forth in claim 10, wherein said shift means is a barrel bus shifter.

16. An image memory data processing control apparatus as set forth in claim 10, wherein said timing control means decodes predetermined digits of address data from said linear interpolation operation unit, said predetermined digits representing coordinate data in a direction at a right angle to the scanning line direction to generate control signals for selecting said pixel registers.

17. An image memory data processing control apparatus as set forth in claim 10, wherein said timing control means generates control signals according to timing determined by a change in the contents of predetermined coordinate data digits of address data from said linear interpolation operation units.

18. An image memory data processing control apparatus as set forth in claim 17, wherein, as to coordinate data in the scanning line direction, the timing control means generates control signals according to timing determined by a change in the contents of a predetermined lower digit representative of the capacity of said pixel registers, and as to coordinate data in a direction at a right angle to the scanning line direction, said timing control means generates the control signals according to timing determined by a change in the contents of the least significant digit.

19. An image memory data processing control apparatus as set forth in claim 10, wherein said image memory unit is a dual-port dynamic random access memory.

20. An image memory data processing control apparatus comprising:

an image memory unit including a plurality of block memories associated with different scanning lines along a scanning line direction of a display means which displays pixel data supplied from said image memory unit;

a plurality of filling linear interpolation operation units for generating access address data for said image memory unit and pixel data in any scanning line direction for said display means;

pixel registers, each of which comprises a plurality of modules for holding pixel data that are continuous in the scanning line direction, each of said pixel registers being associated with a corresponding block memory;

timing control means for generating control signals based on access address data supplied from said linear interpolation operation units, which control signals select said block memories and said pixel registers, each of said timing control means being associated with a corresponding block memory;

write decoding means for generating first module selection signals based on access address data supplied from said linear interpolation operation units, which first module selection signals sequentially select a first predetermined number of modules of said pixel registers;

delay means comprising other linear interpolation operation units for generating access address data after a delay by a predetermined period of time.

read decoding means for generating second module selection signals based on access address data supplied from said delay means, which second module selection signals sequentially select a second predetermined number of modules of said pixel registers;

a plurality of pixel data temporary holding means for continuously storing pixel data supplied from said modules selected by said read decoding means, along a linear interpolation locus, and for supplying the pixel data thus stored to said modules selected by said write decoding means, addresses of said pixel data temporary holding means being successively changed in synchronism with operation of said other linear interpolation operation unit;

shift means adapted to shift pixel data read out from said pixel data temporary holding means by preset shift amounts, said shift amounts being based upon coordinate data defining a direction forming a right angle with the scanning line direction in a source area and based upon coordinate data defining a direction forming a right angle with the scanning line direction in a destination area;

selection means for selectively supplying pixel data generated by said filling linear interpolation operation units or pixel data read out from said pixel data temporary holding means; and operation means for executing a raster operation on the condition that pixel data read out from said pixel data temporary holding means have been selected.

* * * * *